US012202267B2

(12) United States Patent
Okamoto

(10) Patent No.: US 12,202,267 B2
(45) Date of Patent: Jan. 21, 2025

(54) HEAD UNIT AND LIQUID DISCHARGE APPARATUS

(71) Applicant: Seiko Epson Corporation, Tokyo (JP)

(72) Inventor: Asami Okamoto, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 71 days.

(21) Appl. No.: 17/732,676

(22) Filed: Apr. 29, 2022

(65) Prior Publication Data

US 2022/0348008 A1 Nov. 3, 2022

(51) Int. Cl.
*B41J 2/14* (2006.01)
*B41J 2/045* (2006.01)

(52) U.S. Cl.
CPC .......... *B41J 2/14233* (2013.01); *B41J 2/0455* (2013.01); *B41J 2/04581* (2013.01); *B41J 2/04588* (2013.01); *B41J 2002/14491* (2013.01)

(58) Field of Classification Search
CPC .. B41J 2/14233; B41J 2/0455; B41J 2/04581; B41J 2/04588; B41J 2002/14491
See application file for complete search history.

(56) References Cited

U.S. PATENT DOCUMENTS 10,297,743 B2 * 5/2019 Kakiuchi .............. H10N 30/20
2016/0279930 A1 9/2016 Date
2018/0178511 A1 6/2018 Kashimura

FOREIGN PATENT DOCUMENTS

JP 2016-179586 A 10/2016
JP 2018-103614 A 7/2018

* cited by examiner

*Primary Examiner* — Geoffrey S Mruk
(74) *Attorney, Agent, or Firm* — Harness, Dickey & Pierce, P.L.C.

(57) ABSTRACT

There is provided a head unit including: a discharge section that includes a piezoelectric element driven by a first driving signal and discharges a liquid; a switching circuit that switches whether or not to supply the first driving signal; a first substrate that propagates the first driving signal and the discharge control signal to the switching circuit; a second substrate to which the first driving signal and the discharge control signal are supplied and which propagates the first driving signal and the discharge control signal to the first substrate; a first coupling member including a first conductive section that electrically couples the first substrate and the second substrate; and a second coupling member including a second conductive section that electrically couples the first substrate and the second substrate, in which a cross-sectional area of the first conductive section is larger than a cross-sectional area of the second conductive section.

14 Claims, 14 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

HEAD UNIT AND LIQUID DISCHARGE APPARATUS

The present application is based on, and claims priority from JP Application Serial Number 2021-077540, filed Apr. 30, 2021, the disclosure of which is hereby incorporated by reference herein in its entirety.

BACKGROUND

1. Technical Field

The present disclosure relates to a head unit and a liquid discharge apparatus.

2. Related Art

A liquid discharge apparatus that discharges a liquid to a medium has a driving element such as a piezoelectric element that drives based on a driving signal, controls the supply of the driving signal to the driving element to control the drive of the driving element, and controls the amount of liquid discharged in response to the drive of the driving element to form a desired dot on the medium.

For example, JP-A-2016-179586 discloses a liquid discharge apparatus that propagates a driving signal having a plurality of serial trapezoidal waveforms to a liquid discharge unit via a flexible flat cable (FFC), controls a driving amount of the piezoelectric element, which is a driving element, by switching whether or not to supply the trapezoidal waveform included in the driving signal to the piezoelectric element, and controls the amount of ink discharged from the nozzle.

In recent years, in liquid discharge apparatuses, there is an increasing demand for a high image formation speed on a medium, and therefore, a fast dot formation cycle for forming dots having a desired size on a medium by discharging a liquid is required. However, in order to increase the speed of the dot formation cycle, it is necessary to increase the driving amount of the driving element per unit time, and therefore, the amount of current generated by the driving signal for driving the driving element increases. The increase in the amount of current generated by such a driving signal causes the increase in size of the wiring, cable, and connector through which the driving signal propagates, and therefore, there is a concern that the size of the head unit that discharges the medium becomes large. JP-A-2016-179586 does not describe the problem at all that there is a concern about the increase in the amount of current generated by the driving signal due to such an increase in the image formation speed, and an increase in the size of the head unit due to the increase in the amount of current. From this point of view, the liquid discharge apparatus described in JP-A-2016-179586 has room for improvement.

SUMMARY

According to an aspect of the present disclosure, there is provided a head unit including: a discharge section that includes a piezoelectric element driven by a first driving signal and discharges a liquid in response to drive of the piezoelectric element; a switching circuit that switches whether or not to supply the first driving signal to the piezoelectric element based on a discharge control signal; a first substrate that propagates the first driving signal and the discharge control signal to the switching circuit; a second substrate to which the first driving signal and the discharge control signal are supplied and which propagates the first driving signal and the discharge control signal to the first substrate; a first coupling member including a first conductive section that electrically couples the first substrate and the second substrate to each other; and a second coupling member including a second conductive section that electrically couples the first substrate and the second substrate to each other, in which a cross-sectional area of the first conductive section is larger than a cross-sectional area of the second conductive section.

According to another aspect of the present disclosure, there is provided a liquid discharge apparatus including: a driving circuit unit having a first driving signal output circuit that outputs a first driving signal; a discharge control unit that outputs a discharge control signal; and a head unit that discharges a liquid based on the first driving signal and the discharge control signal, in which the head unit includes a discharge section that includes a piezoelectric element driven by the first driving signal and discharges the liquid in response to drive of the piezoelectric element, a switching circuit that switches whether or not to supply the first driving signal to the piezoelectric element based on the discharge control signal, a first substrate that propagates the first driving signal and the discharge control signal to the switching circuit, a second substrate to which the first driving signal and the discharge control signal are supplied and which propagates the first driving signal and the discharge control signal to the first substrate, a first coupling member including a first conductive section that electrically couples the first substrate and the second substrate to each other, and a second coupling member including a second conductive section that electrically couples the first substrate and the second substrate to each other, and a cross-sectional area of the first conductive section is larger than a cross-sectional area of the second conductive section.

DESCRIPTION OF EXEMPLARY EMBODIMENTS

Figure 1:
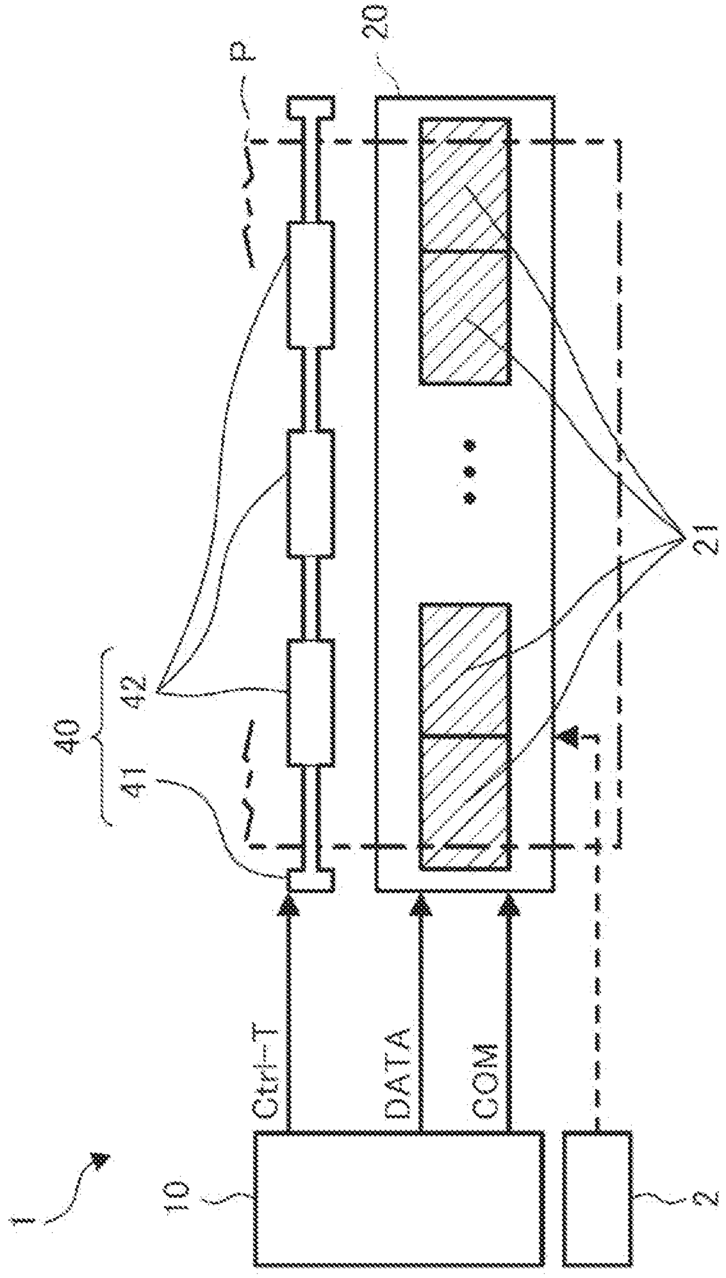
FIG. 1 is a view illustrating a schematic configuration of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Moreover, not all of the configurations which will be described below are necessarily essential components of the present disclosure.

1. Configuration of Liquid Discharge Apparatus

FIG. 1 is a view illustrating a schematic configuration of a liquid discharge apparatus 1. As illustrated in FIG. 1, the liquid discharge apparatus 1 in the present embodiment is a line type ink jet printer that forms a desired image on a medium P by discharging ink, which is an example of a liquid, to the medium P transported by a medium transport unit 40, at a desired timing. Here, in the following description, the width direction of the medium P to be transported may be referred to as a main scanning direction, and the direction in which the medium P is transported may be referred to as a transport direction.

As illustrated in FIG. 1, the liquid discharge apparatus 1 includes a liquid container 2, a control unit 10, a liquid discharge unit 20, and a medium transport unit 40.

The ink supplied to the liquid discharge unit 20 is stored in the liquid container 2. Specifically, the liquid container 2 stores inks of a plurality of colors, such as black, cyan, magenta, yellow, red, and gray, which are discharged to the medium P. As the liquid container 2, an ink cartridge, a bag-shaped ink pack made of a flexible film, an ink tank capable of replenishing ink, and the like can be used.

The control unit 10 includes a processing circuit such as a central processing unit (CPU) or a field programmable gate array (FPGA), and a storage circuit such as a semiconductor memory. In addition, the control unit 10 outputs a control signal for controlling each element of the liquid discharge apparatus 1.

The liquid discharge unit 20 has a plurality of head modules 21. In the liquid discharge unit 20, the plurality of head modules 21 are arranged side by side along the main scanning direction so as to be equal to or larger than the width of the medium P. In other words, the liquid discharge apparatus 1 includes the plurality of head modules 21, and the plurality of head modules 21 are arranged side by side along the main scanning direction intersecting the transport direction in which the medium P to which ink, which is as an example of the liquid, is discharged is transported.

A data signal DATA for controlling the operation of the plurality of head modules 21 and a driving signal COM for driving the head module 21 such that the ink is discharged from each of the plurality of head modules 21 are input from the control unit 10 to each of the plurality of head modules 21 included in the liquid discharge unit 20. Further, the ink stored in the liquid container 2 is supplied to each of the plurality of head modules 21 via a tube (not illustrated) or the like. Then, each of the plurality of head modules 21 discharges the ink supplied from the liquid container 2 based on the input data signal DATA and the driving signal COM.

The medium transport unit 40 includes a transport motor 41 and a transport roller 42. The transport motor 41 operates based on a transport control signal Ctrl-T input from the control unit 10. The transport roller 42 is rotationally driven by the operation of the transport motor 41. Then, the medium P is transported along the transport direction by the rotational drive of the transport roller 42.

In the liquid discharge apparatus 1 configured as described above, the control unit 10 interlocks with the transport of the medium P by the medium transport unit 40, and discharges ink from the plurality of head modules 21 included in the liquid discharge unit 20. Accordingly, the liquid discharge apparatus 1 makes the ink land at a desired position on the medium P, and forms a desired image on the medium P.

Figure 2A:
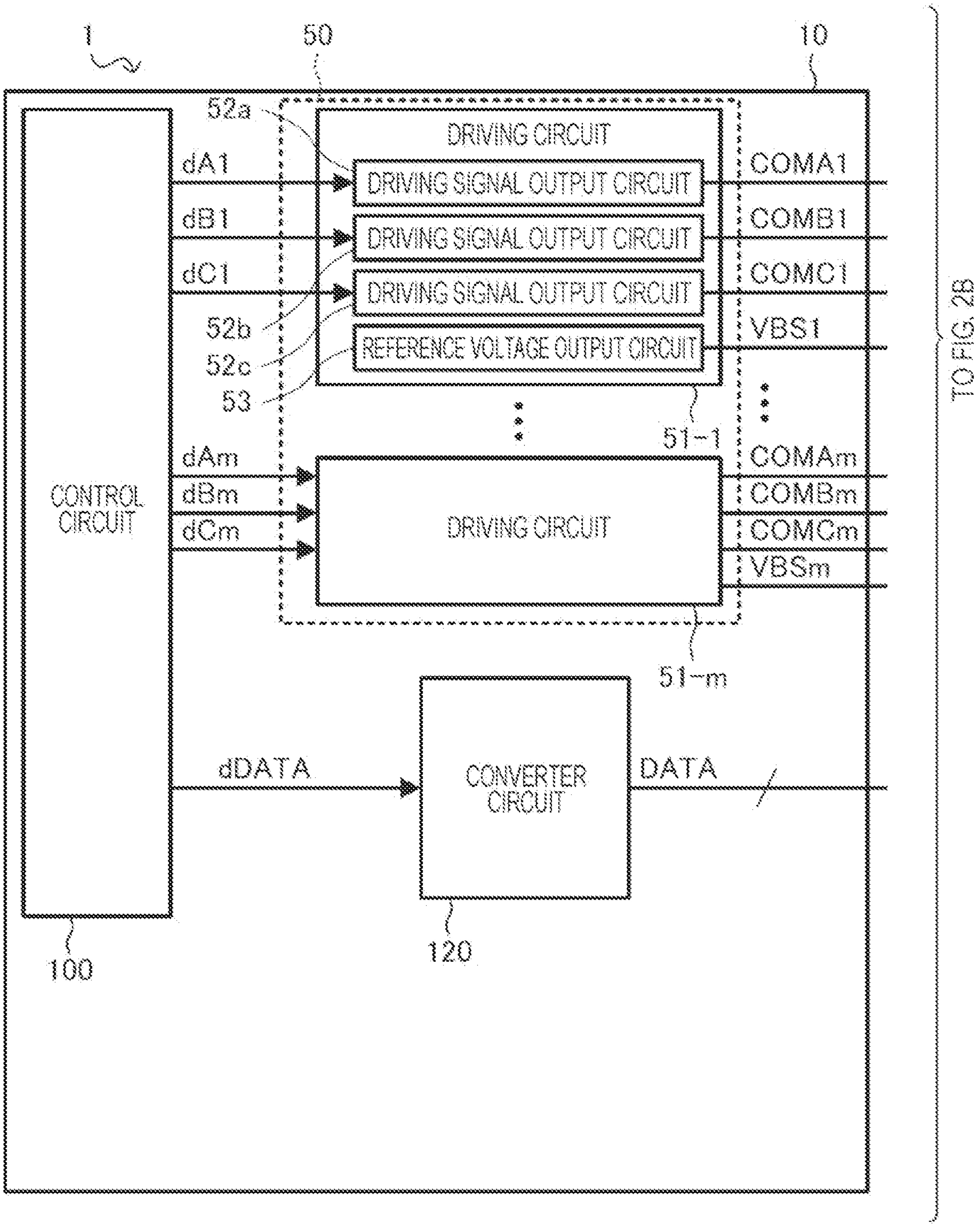
FIG. 2 is a view illustrating a functional configuration of the liquid discharge apparatus.
Figure 2B:
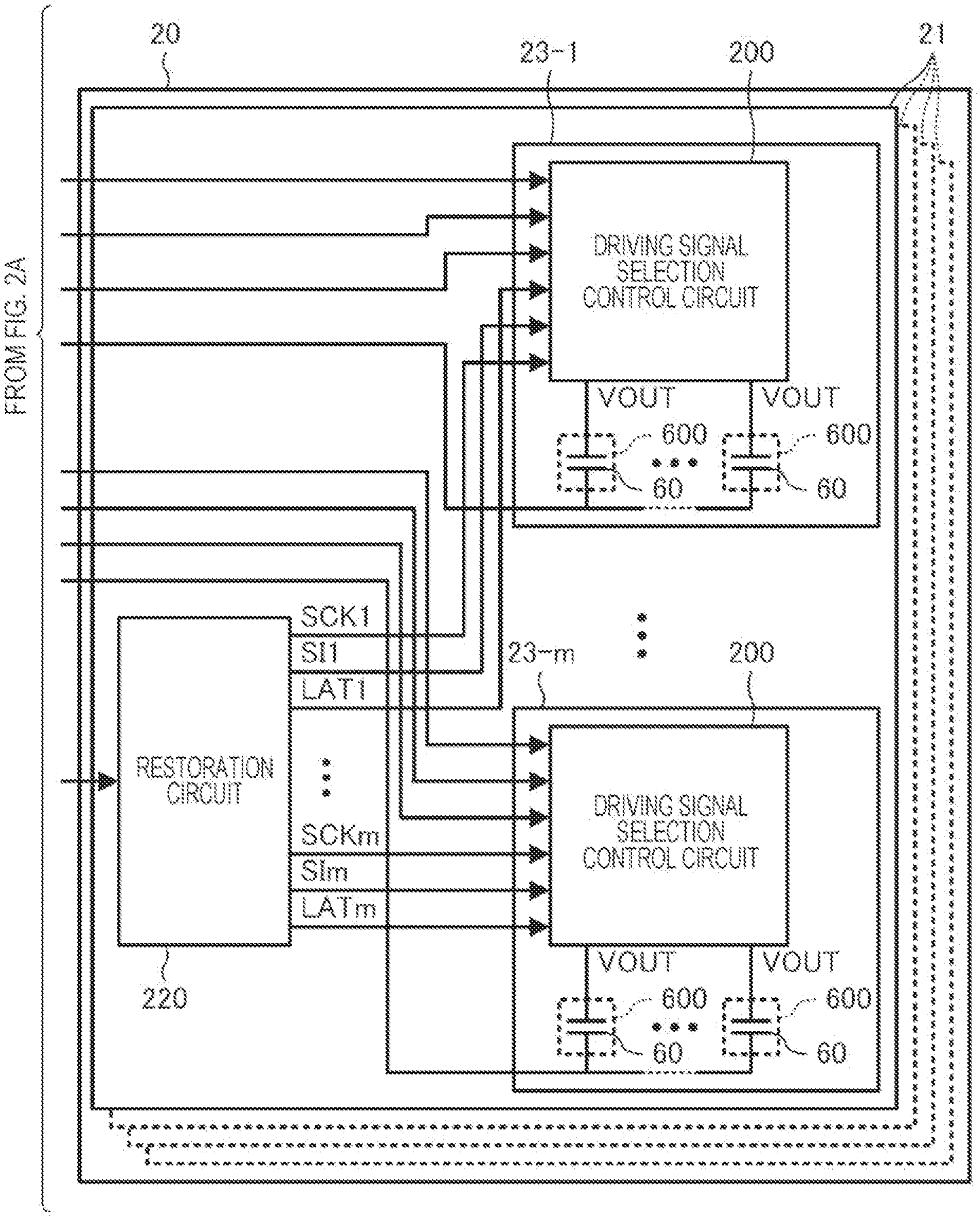

Here, a specific example of control of the liquid discharge unit 20 by the control unit 10 will be described. FIG. 2 is a view illustrating a functional configuration of the liquid discharge apparatus 1. In FIG. 2, only the electrical coupling between the control unit 10 and the liquid discharge unit 20 is illustrated, and the medium transport unit 40 and the liquid container 2 are not illustrated.

As illustrated in FIG. 2, the liquid discharge apparatus 1 includes the control unit 10 and the liquid discharge unit 20. The control unit 10 includes a control circuit 100, a driving circuit unit 50, and a converter circuit 120. Further, the driving circuit unit 50 includes driving circuits 51-1 to **51-*m*. The liquid discharge unit 20 includes the plurality of head modules 21. The control unit 10 and each of the plurality of head modules 21 included in the liquid discharge unit 20** are electrically coupled to each other by a cable (not illustrated).

Here, the plurality of head modules 21 all have the same configuration. Therefore, FIG. 2 illustrates only the circuit configuration included in one head module 21, and the circuit configurations included in other head modules 21 is not illustrated. Further, in the following description, only the operation and functional configuration of one head module 21 will be described, and the description of the operations and functional configurations of other head modules 21 will be omitted or simplified.

The control circuit 100 includes an integrated circuit such as a CPU and an FPGA. A signal such as image data formed on the medium P is input to the control circuit 100 from an external device such as a host computer (not illustrated). The control circuit 100 outputs a control signal for controlling each element of the liquid discharge apparatus 1 based on the signal such as the input image data.

The control circuit 100 generates a reference data signal dDATA which is a reference of a data signal DATA to be output to the liquid discharge unit 20 based on the signal such as the input image data, and outputs the generated signal to the converter circuit 120. The converter circuit 120 converts the reference data signal dDATA into the data signal DATA of a differential signal such as a low voltage differential signaling (LVDS), and outputs the converted data to the head module 21 included in the liquid discharge unit 20. The converter circuit 120 may generate the data signal DATA obtained by converting the reference data signal dDATA into various high-speed transfer type differential signals such as a low voltage positive emitter coupled logic (LVPECL) and a current mode logic (CML) other than LVDS, and output the generated signal to the head module 21. In addition, the converter circuit 120 may convert a part or the entirety of the input reference data signal dDATA into the single-ended data signal DATA, and output the converted signal to the head module 21.

Further, the control circuit 100 outputs reference driving signals dA1, dB1, and dC1 to the driving circuit 51-1 included in the driving circuit unit 50. The driving circuit 51-1 includes driving signal output circuits 52*a*, 52*b*, and 52*c* having the same circuit configuration.

The reference driving signal dA1 is input to the driving signal output circuit 52*a* included in the driving circuit 51-1. The driving signal output circuit 52*a* generates a driving signal COMA1 by digital-to-analog converting the input reference driving signal dA1 and then applying class D amplification to the analog signal, and outputs the generated driving signal COMA1 to the head module 21. The reference driving signal dB1 is input to the driving signal output circuit 52*b* included in the driving circuit 51-1. The driving signal output circuit 52*b* generates a driving signal COMB1 by digital-to-analog converting the input reference driving signal dB1 and then applying class D amplification to the analog signal, and outputs the generated driving signal COMB1 to the head module 21. The reference driving signal dC1 is input to the driving signal output circuit 52*c* included in the driving circuit 51-1. The driving signal output circuit 52*c* generates a driving signal COMC1 by digital-to-analog converting the input reference driving signal dC1 and then applying class D amplification to the analog signal, and outputs the generated driving signal COMC1 to the head module 21.

Here, each of the driving signal output circuits 52*a*, 52*b*, and 52*c* may be configured to include a class A amplifier circuit, a class B amplifier circuit, a class AB amplifier circuit or the like instead of the class D amplifier circuit or in addition to the class D amplifier circuit as long as the driving signals COMA1, COMB1, and COMC1 can be generated by amplifying the waveforms regulated by each of the reference driving signals dA1, dB1, and dC1, which are the input digital signals. Further, each of the reference driving signals dA1, dB1 and dC1 may be a signal that can regulate the waveforms of the corresponding driving signals COMA1, COMB1 and COMC1, or may be an analog signal.

Further, the driving circuit 51-1 has a reference voltage output circuit 53. The reference voltage output circuit 53 generates a constant potential reference voltage signal VBS1 indicating a reference potential of the piezoelectric element 60 (which will be described later) included in the head module 21 by boosting or stepping down the power supply voltage (not illustrated) used in the liquid discharge apparatus 1, and outputs the generated signal to the head module 21. The reference voltage signal VBS1 output by the reference voltage output circuit 53 may be a constant signal at a ground potential, or may be a constant signal at a potential such as 5.5 V or 6 V. In addition, a case where the potential is constant includes a case where the potential is substantially constant when errors such as potential fluctuations caused by the operation of peripheral circuits, potential fluctuations caused by variations in circuit elements, and potential fluctuations caused by temperature characteristics are taken into consideration.

Here, the driving circuits 51-1 to 51-*m* included in the driving circuit unit 50 differ only in the input signal and the output signal, and both have the same configuration. Specifically, the driving circuit 51-*m* includes a circuit corresponding to the driving signal output circuits 52*a*, 52*b*, and 52*c* and a circuit corresponding to the reference voltage output circuit 53, generates driving signals COMAm, COMBm, and COMCm and a reference voltage signal VBSm based on the reference driving signals dAm, dBm, and dCm, which are input from the control circuit 100, and outputs the generated signals to the head module 21. Similarly, the driving circuit 51-*j* (j is any number of 1 to m) includes a circuit corresponding to the driving signal output circuits 52*a*, 52*b*, and 52*c* and a circuit corresponding to the reference voltage output circuit 53, generates driving signals COMAj, COMBj, and COMCj and a reference voltage signal VBSj based on the reference driving signals dAj, dBj, and dCj, which are input from the control circuit 100, and outputs the generated signals to the head module 21.

The plurality of head modules 21 included in the liquid discharge unit 20 each includes a restoration circuit 220 and discharge modules 23-1 to 23-*m*.

The restoration circuit 220 restores the data signal DATA of the differential signal output by the control unit 10 to a single-ended signal, separates the restored signal into signals corresponding to each of the discharge modules 23-1 to 23-*m*, and outputs the separated signals to the corresponding discharge modules 23-1 to 23-*m*.

Specifically, the restoration circuit 220 restores and separates the data signal DATA of the differential signal output by the control unit 10 to generate a clock signal SCK1, a print data signal SI1, and a latch signal LAT1 corresponding to the discharge module 23-1. Then, the restoration circuit 220 outputs the generated clock signal SCK1, the print data signal SI1, and the latch signal LAT1 to the discharge module 23-1. Further, the restoration circuit 220 restores and separates the data signal DATA of the differential signal output by the control unit 10 to generate a clock signal SCKm, a print data signal SIm, and a latch signal LATm corresponding to the discharge module 23-*m*, and output the generated signals to the discharge module 23-*m*. Further, the restoration circuit 220 restores and separates the data signal DATA of the differential signal output by the control unit 10 to generate a clock signal SCKj, a print data signal SIj, and a latch signal LATj corresponding to the discharge module 23-*j*, and output the generated signals to the discharge module 23-*j*. The clock signal SCK1 corresponding to the discharge module 23-1 output by the restoration circuit 220, the clock signal SCKj corresponding to the discharge module 23-*j*, and the clock signal SCKm corresponding to the discharge module 23-*m* may be common signals.

As described above, the restoration circuit 220 restores the data signal DATA of the differential signal output by the control unit 10 and separates the restored signal into signals corresponding to the discharge modules 23-1 to 23-*m*. Accordingly, the restoration circuit 220 generates the clock signals SCK1 to SCKm, the print data signals SI1 to SIm, and the latch signals LAT1 to LATm corresponding to each of the discharge modules 23-1 to 23-*m* included in the head module 21, and outputs the generated signals to the corresponding discharge modules 23-1 to 23-*m*.

Here, in view of the fact that the restoration circuit 220 restores and separates the data signal DATA of the differential signal to generate the clock signals SCK1 to SCKm, the print data signals SI1 to SIm, and the latch signals LAT1 to LATm, the reference data signal dDATA, which is the reference of the data signal DATA output by the control circuit 100 includes signals corresponding to each of the clock signals SCK1 to SCKm, the print data signals SI1 to SIm, and the latch signals LAT1 to LATm, and the data signal DATA output by the converter circuit 120 includes differential signals corresponding to the clock signals SCK1 to SCKm, differential signals corresponding to the print data signals SI1 to SIm, and differential signals corresponding to the latch signals LAT1 to LATm.

The converter circuit 120 may output the differential signals corresponding to the clock signals SCK1 to SCKm, the differential signals corresponding to the print data signals SI1 to SIm, and the differential signals corresponding to the latch signals LAT1 to LATm, as differential signals which are different from each other. Further, without converting any of the clock signals SCK1 to SCKm, the print data signals SI1 to SIm, and the latch signals LAT1 to LATm, which are included in the reference data signal dDATA, into a differential signal, the converter circuit 120 may output the signals as single-ended signals.

The discharge module 23-1 includes a driving signal selection control circuit 200 and a plurality of discharge sections 600. Further, each of the plurality of discharge sections 600 includes a piezoelectric element 60. The driving signals COMA1, COMB1, and COMC1, the reference voltage signal VBS1, the clock signal SCK1, the print data signal SI1, and the latch signal LAT1 are input to the discharge module 23-1.

Among the signals input to the discharge module 23-1, the driving signals COMA1, COMB1, and COMC1, the clock signal SCK1, the print data signal SI1, and the latch signal LAT1 are input to the driving signal selection control circuit 200 included in the discharge module 23-1. The driving signal selection control circuit 200 selects or deselects each of the driving signals COMA1, COMB1, and COMC1 based on the input clock signal SCK1, the print data signal SI1, and the latch signal LAT1 to generate the driving signal VOUT, and supply the generated driving signal VOUT to one end of the piezoelectric element 60 included in the corresponding discharge section 600. At this time, the reference voltage signal VBS1 is supplied to the other end of the piezoelectric element 60. Then, the piezoelectric element 60 included in the plurality of discharge sections 600 is driven by the potential difference between the driving signal VOUT supplied to one end and the reference voltage signal VBS1 supplied to the other end.

Similarly, the discharge module **23-*m* includes the driving signal selection control circuit 200 and the plurality of discharge sections 600. Further, each of the plurality of discharge sections 600 includes a piezoelectric element 60. The driving signals COMAm, COMBm, and COMCm, the reference voltage signal VBSm, the clock signal SCKm, the print data signal SIm, and the latch signal LATm are input to the discharge module 23-*m*. Among these, the driving signals COMAm, COMBm, and COMCm, the clock signal SCKm, the print data signal SIm, and the latch signal LATm are input to the driving signal selection control circuit 200 included in the discharge module 23-*m*. The driving signal selection control circuit 200 selects or deselects each of the driving signals COMAm, COMBm, and COMCm based on the input clock signal SCKm, the print data signal SIm, and the latch signal LATm to generate the driving signal VOUT, and supply the generated driving signal VOUT to one end of the piezoelectric element 60 included in the corresponding discharge section 600. Further, the reference voltage signal VBSm is commonly supplied to the other end of the piezoelectric element 60 included in the plurality of discharge sections 600. As a result, the piezoelectric element 60 included in the plurality of discharge sections 600** is driven by the potential difference between the driving signal VOUT supplied to one end and the reference voltage signal VBSm supplied to the other end.

Similarly, the discharge module **23-*j* includes the driving signal selection control circuit 200 and the plurality of discharge sections 600. Further, each of the plurality of discharge sections 600 includes a piezoelectric element 60. The driving signals COMAj, COMBj, and COMCj, the reference voltage signal VBSj, the clock signal SCKj, the print data signal SIj, and the latch signal LATj are input to the discharge module 23-*j*. Among these, the driving signals COMAj, COMBj, and COMCj, the clock signal SCKj, the print data signal SIj, and the latch signal LATj are input to the driving signal selection control circuit 200 included in the discharge module 23-*j*. The driving signal selection control circuit 200 selects or deselects each of the driving signals COMAj, COMBj, and COMCj based on the input clock signal SCKj, the print data signal SIj, and the latch signal LATj to generate the driving signal VOUT, and supply the generated driving signal VOUT to one end of the piezoelectric element 60 included in the corresponding discharge section 600. Further, the reference voltage signal VBSj is commonly supplied to the other end of the piezoelectric element 60 included in the plurality of discharge sections 600. As a result, the piezoelectric element 60 included in the plurality of discharge sections 600** is driven by the potential difference between the driving signal VOUT supplied to one end and the reference voltage signal VBSj supplied to the other end.

Then, the discharge modules 23-1 to **23-*m* are driven by the piezoelectric element 60 to discharge an amount of ink corresponding to the drive of the piezoelectric element 60**.

In the liquid discharge apparatus 1 configured as described above, the driving circuit unit 50 including the driving signal output circuit **52*a* that outputs the driving signals COMA1 to COMAm, the driving signal output circuit 52*b* that outputs the driving signals COMB1 to COMBm, and the driving signal output circuit 52*c* that outputs the driving signals COMC1 to COMCm is an example of a driving circuit unit, the control circuit 100 that outputs the reference data signal dDATA which is a reference of the clock signals SCK1 to SCKm, the print data signals SI1 to SIm, and the latch signals LAT1 to LATm is an example of a discharge control unit, and the head module 21** that discharges the ink based on the driving signals COMA1 to COMAm, COMB1 to COMBm, and COMC1 to COMCm, the clock signals SCK1 to SCKm based on the reference data signal dDATA, the print data signals SI1 to SIm, and the latch signals LAT1 to LATm is an example of a head unit.

2. Functional Configuration of Driving Signal Selection Control Circuit

Next, the operation of the driving signal selection control circuit 200 included in the discharge modules 23-1 to **23-*m* will be described. Here, the discharge modules 23-1 to 23-*m* differ from each other only in the input signals, and all have the same configuration. Therefore, in the following description, when it is not necessary to distinguish the discharge modules 23-1 to 23-*m* from each other, there is a case of being simply referred to as a discharge module 23. Further, in this case, the driving signals COMA1 to COMAm input to the discharge module 23** are referred to as driving signals COMA, the driving signals COMB1 to COMBm are referred to as driving signals COMB, the driving signals COMC1 to COMCm are referred to as driving signals COMC, the clock signals SCK1 to SCKm are referred to as clock signals SCK, the print data signals SI1 to SIm are referred to as print data signals SI, and the latch signals LAT1 to LATm are referred to as latch signals LAT.

In describing the functional configuration of the driving signal selection control circuit 200 included in the discharge module 23, first, an example of signal waveforms included in the driving signals COMA, COMB, and COMC input to the driving signal selection control circuit 200 will be described.

Figure 3:
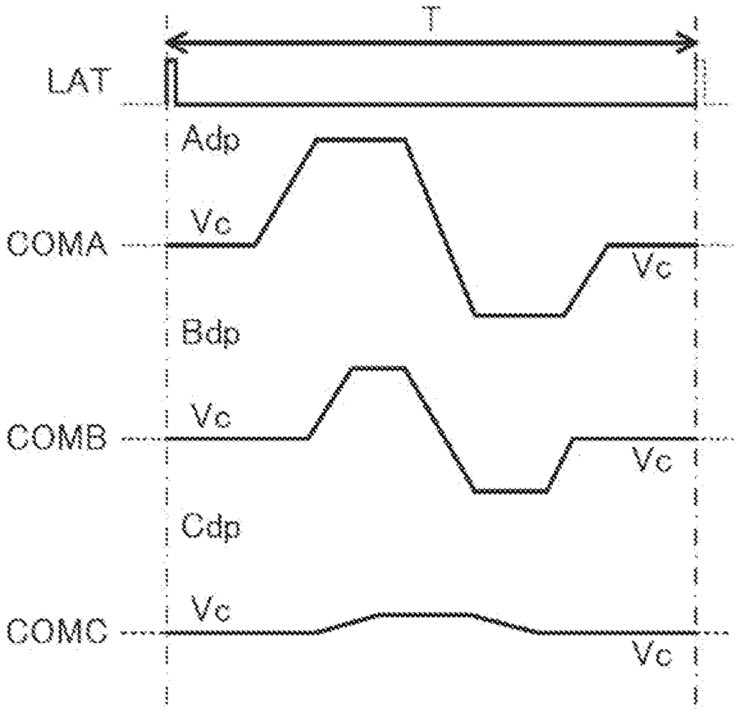
FIG. 3 is a view illustrating an example of signal waveforms of driving signals.

FIG. 3 is a view illustrating an example of signal waveforms of the driving signals COMA, COMB, and COMC. As illustrated in FIG. 3, the driving signal COMA includes a trapezoidal waveform Adp arranged in a cycle T from the rise of the latch signal LAT to the next rise of the latch signal LAT, the driving signal COMB includes a trapezoidal waveform Bdp arranged in the cycle T, and the driving signal COMC includes a trapezoidal waveform Cdp arranged in the cycle T. Here, the cycle T from the rise of the latch signal LAT to the next rise of the latch signal LAT corresponds to the dot formation cycle for forming dots having a desired size on the medium P.

The trapezoidal waveform Adp is a waveform that is supplied to one end of the piezoelectric element 60 to discharge a predetermined amount of ink from the discharge section 600 corresponding to the piezoelectric element 60. Further, the trapezoidal waveform Bdp is a waveform of which a voltage amplitude is smaller than that of the trapezoidal waveform Adp. When the trapezoidal waveform Bdp is supplied to one end of the piezoelectric element 60, a smaller amount of ink than a predetermined amount is discharged from the discharge section 600 corresponding to the piezoelectric element 60. The trapezoidal waveform Cdp is a waveform of which a voltage amplitude is smaller than those of the trapezoidal waveforms Adp and Bdp. When this trapezoidal waveform Cdp is supplied to one end of the piezoelectric element 60, the ink in the vicinity of the nozzle opening portion is vibrated to the extent that the ink is not discharged from the discharge section 600 corresponding to the piezoelectric element 60. Accordingly, the concern that the viscosity of the ink in the vicinity of the nozzle opening portion increases is reduced.

The voltages at the start timing and the end timing of each of the trapezoidal waveforms Adp, Bdp, and Cdp are a voltage Vc which is a common voltage. In other words, each of the trapezoidal waveforms Adp, Bdp, and Cdp is a waveform that starts at the voltage Vc and ends at the voltage Vc.

Here, in the following description, when the trapezoidal waveform Adp is supplied to one end of the piezoelectric element 60, the amount of ink discharged from the discharge section 600 corresponding to the piezoelectric element 60 may be referred to as a large amount, and when the trapezoidal waveform Bdp is supplied to one end of the piezoelectric element 60, the amount of ink discharged from the discharge section 600 corresponding to the piezoelectric element 60 may be referred to as a small amount. Further, vibrating the ink in the vicinity of the nozzle opening portion to the extent that the ink is not discharged from the discharge section 600 corresponding to the piezoelectric element 60 may be referred to as micro-vibration.

The driving signals COMA, COMB, and COMC may be signals having a continuous waveform of two or more trapezoidal waveforms in the cycle T. In this case, a signal for regulating the boundary between two or more trapezoidal waveforms, that is, a signal for regulating the switching timing of the two or more trapezoidal waveforms, may be input to the driving signal selection control circuit 200. In this case, in the cycle T corresponding to the dot formation cycle, the discharge section 600 may discharge the ink plural times, and the ink discharged in plural times lands on the medium P and is combined to form one dot. On the other hand, in the present embodiment, the driving signals COMA, COMB, and COMC will be described as signals including one trapezoidal waveform in the cycle T. Accordingly, regarding the cycle T, compared to a case where the driving signals COMA, COMB, and COMC include a plurality of trapezoidal waveforms, the cycle T corresponding to the dot formation cycle can be shortened, and a high image formation speed on the medium P can be achieved.

Figure 4:
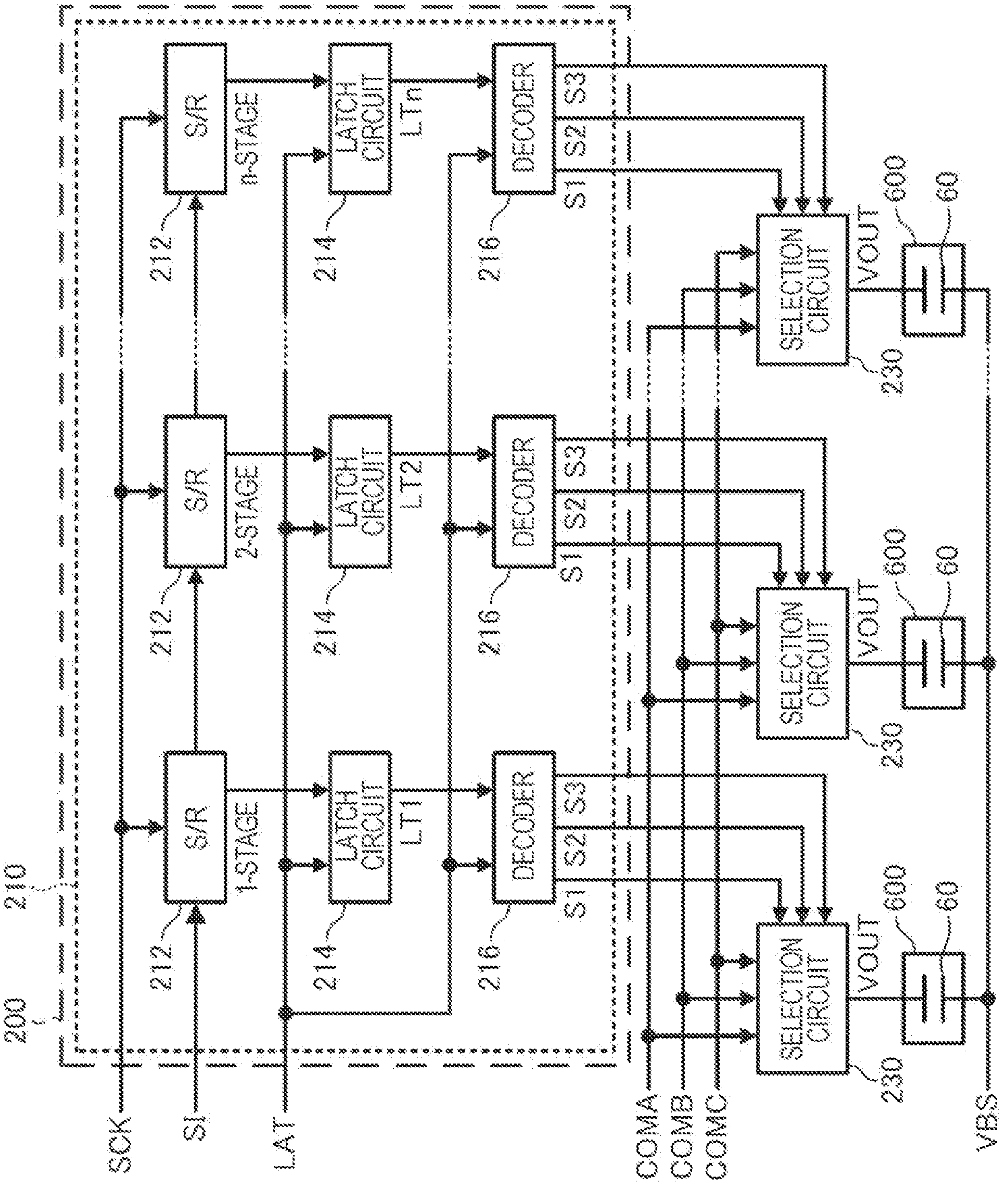
FIG. 4 is a view illustrating a functional configuration of a driving signal selection control circuit.

Next, the functional configuration and operation of the driving signal selection control circuit 200 will be described with reference to FIGS. 4 to 7. FIG. 4 is a view illustrating a functional configuration of the driving signal selection control circuit 200. As illustrated in FIG. 4, the driving signal selection control circuit 200 includes a selection control circuit 210 and a plurality of selection circuits 230.

The print data signal SI, the latch signal LAT, and the clock signal SCK are input to the selection control circuit 210. In the selection control circuit 210, sets of a shift register (S/R) 212, a latch circuit 214, and a decoder 216 are provided corresponding to each of n discharge sections 600. In other words, the driving signal selection control circuit 200 includes n (the same number as the total number of discharge sections 600) sets of the shift register 212, the latch circuit 214, and the decoder 216.

Specifically, the print data signal SI is a signal synchronized with the clock signal SCK, and is a signal of a total of 2n bits including 2-bit print data [SIH, SIL] for selecting any one of "large dot LD", "small dot SD", "Non-discharge ND", and "Micro-vibration BSD" with respect to each of n discharge sections 600. The print data signal SI is held in the shift register 212 for each of the two bits of print data [SIH, SIL] included in the print data signal SI, corresponding to discharge sections 600. Specifically, n stages of shift register 212 corresponding to the discharge sections 600 are continuously coupled to each other, and the serially input print data signal SI is sequentially transferred to the subsequent stage in accordance with the clock signal SCK. In FIG. 4, in order to distinguish the shift registers 212 from each other, the shift register 212 is denoted as 1-stage, 2-stage, . . . , and n-stage in order from the upstream to which the print data signal SI is input.

Each of n latch circuits 214 latches the 2-bit print data [SIH, SIL] held by each of n shift registers 212 all at once at the rise of the latch signal LAT.

Each of the n decoders 216 decodes the 2-bit print data [SIH, SIL] latched by each of the n latch circuits 214. Further, the decoder 216 outputs selection signals S1, S2, and S3 for each cycle T regulated by the latch signal LAT.

Figures 5, 6:
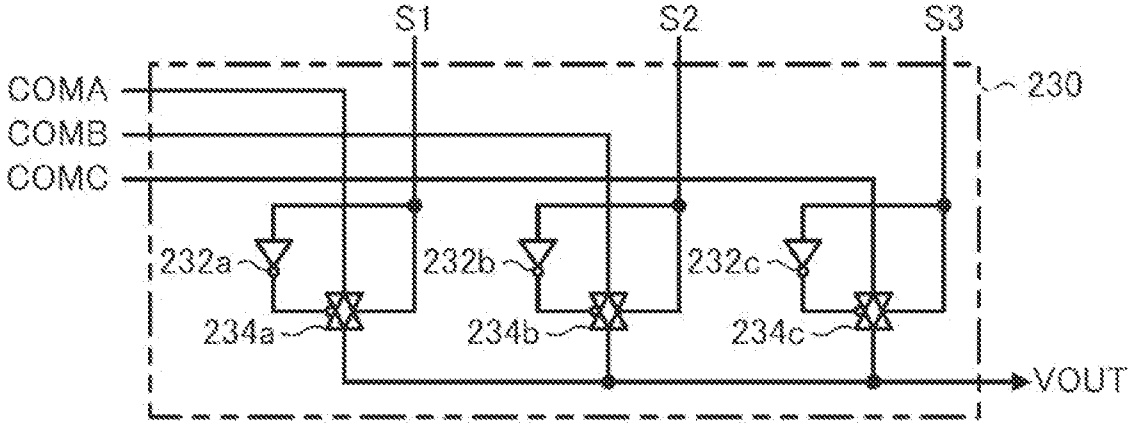
FIG. 5 is a view illustrating decoding contents in a decoder.
FIG. 6 is a view illustrating a configuration of a selection circuit that corresponds to one discharge section.

FIG. 5 is a view illustrating the decoding contents in the decoder 216. The decoder 216 outputs the selection signals S1, S2, and S3 according to the latched 2-bit print data [SIH, SIL]. For example, when the 2-bit print data [SIH, SIL] is [1, 0], the decoder 216 outputs the logic levels of the selection signals S1, S2, and S3 as L, H, and L levels to the selection circuit 230 in the cycle T.

The selection circuit 230 is provided corresponding to each of the discharge sections 600. In other words, the number of selection circuits 230 of the driving signal selection control circuit 200 is n, which is the same as the total number of the corresponding discharge sections 600.

FIG. 6 is a view illustrating a configuration of the selection circuit 230 that corresponds to one discharge section 600. As illustrated in FIG. 6, the selection circuit 230 has inverters 232*a*, 232*b*, and 232*c* which are NOT circuits, and transfer gates 234*a*, 234*b*, and 234*c*.

While the selection signal S1 is input to a positive control end, which is not marked with a circle, at the transfer gate 234*a*, the selection signal S1 is logically inverted by the inverter 232*a* and is input to a negative control end marked with a circle at the transfer gate 234*a*. The driving signal COMA is supplied to the input end of the transfer gate 234*a*. In addition, the transfer gate 234*a* conducts the input end and the output end to each other when the input selection signal S1 is the H level, and does not conduct the input end and the output end to each other when the input selection signal S1 is the L level.

While the selection signal S2 is input to a positive control end, which is not marked with a circle, at the transfer gate 234*b*, the selection signal S2 is logically inverted by the inverter 232*b* and is input to a negative control end marked with a circle at the transfer gate 234*b*. The driving signal COMB is supplied to the input end of the transfer gate 234*b*. In addition, the transfer gate 234*b* conducts the input end and the output end to each other when the input selection signal S2 is the H level, and does not conduct the input end and the output end to each other when the input selection signal S2 is the L level.

While the selection signal S3 is input to a positive control end, which is not marked with a circle, at the transfer gate 234*c*, the selection signal S3 is logically inverted by the inverter 232*c* and is input to a negative control end marked with a circle at the transfer gate 234*c*. The driving signal COMC is supplied to the input end of the transfer gate 234*c*. In addition, the transfer gate 234*c* conducts the input end and the output end to each other when the input selection signal S3 is the H level, and does not conduct the input end and the output end to each other when the input selection signal S3 is the L level.

The output ends of the transfer gates 234*a*, 234*b*, and 234*c* are commonly coupled to each other. Accordingly, as the transfer gates 234*a*, 234*b*, and 234*c* are switched between conduction and non-conduction, signals obtained by selecting or deselecting the driving signals COMA, COMB, and COMC are supplied to the output ends of the commonly coupled transfer gates 234*a*, 234*b*, and 234*c*. The signals supplied to the output ends of the commonly coupled transfer gates 234*a*, 234*b*, and 234*c* correspond to the driving signal VOUT.

Figure 7:
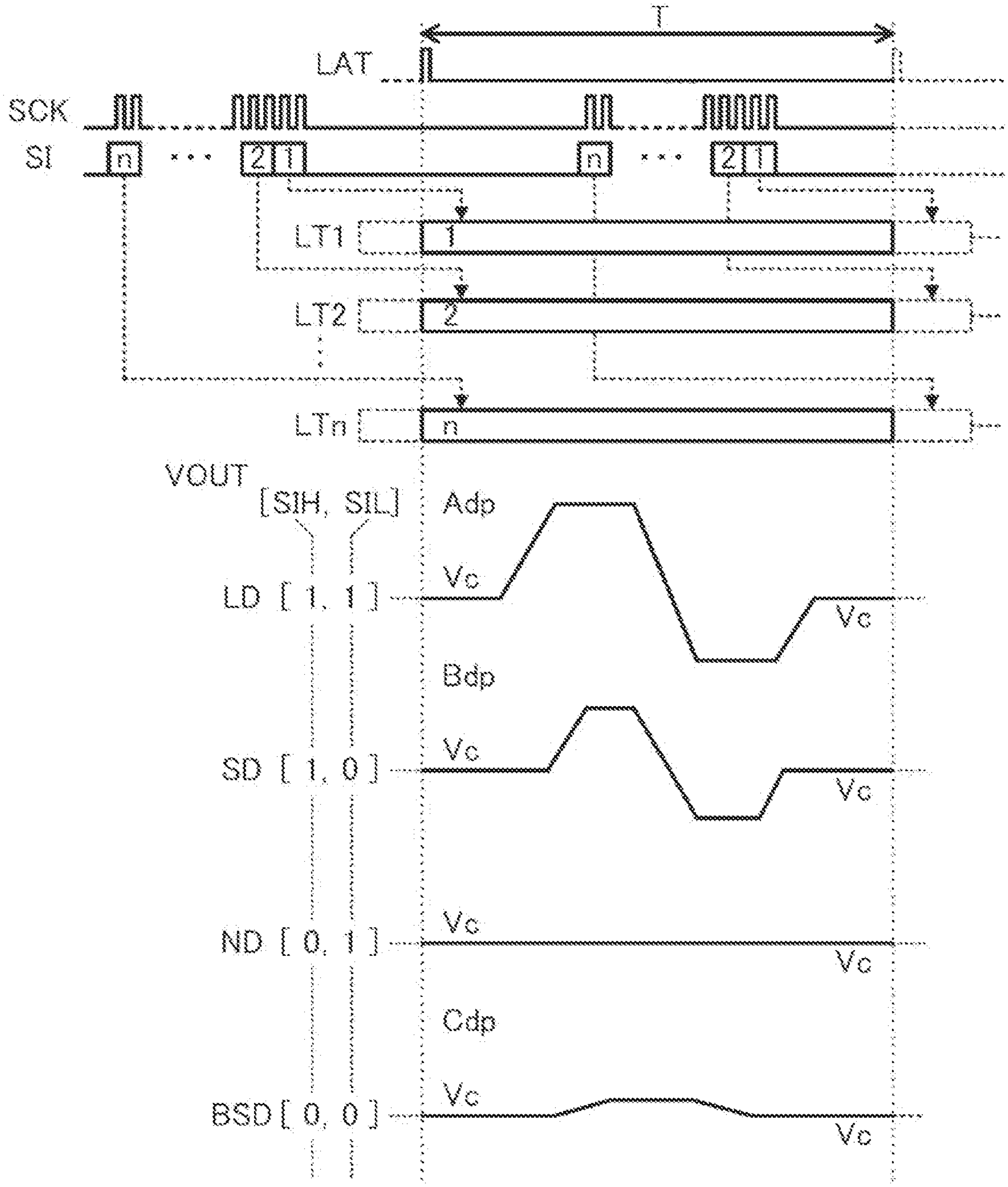
FIG. 7 is a view for describing an operation of the driving signal selection control circuit.

The operation of the driving signal selection control circuit 200 will be described with reference to FIG. 7. FIG. 7 is a view for describing the operation of the driving signal selection control circuit 200. The print data signals SI are serially input in synchronization with the clock signal SCK and sequentially transferred in the shift register 212 that corresponds to the discharge section 600. Then, when the input of the clock signal SCK is stopped, the 2-bit print data [SIH, SIL] that corresponds to each of the discharge sections 600 is held in each of the shift registers 212. The print data signal SI is input in order corresponding to the n-stage, . . . , 2-stage, and 1-stage discharge sections 600 of the shift register 212.

When the latch signal LAT rises, each of the latch circuits 214 latches the 2-bit print data [SIH, SIL] held in the shift register 212 all at once. In FIG. 7, LT1, LT2, . . . , and LTn indicate the 2-bit print data [SIH, SIL] latched by the latch circuit 214 corresponding to the 1-stage, 2-stage, . . . , and the n-stage shift registers 212.

The decoder 216 outputs the logic levels of the selection signals S1, S2, and S3 in the cycle T with the contents illustrated in FIG. 5, corresponding to the size of the dot regulated by the latched 2-bit print data [SIH, SIL].

Specifically, when the print data [SIH, SIL] is [1, 1], the decoder 216 sets the selection signal S1 to the H level, the selection signal S2 to the L level, and the selection signal S3 to the L level in the cycle T. In this case, the selection circuit 230 selects the trapezoidal waveform Adp in the cycle T, and as a result, the driving signal VOUT corresponding to the "large dot LD" is output.

Further, when the print data [SIH, SIL] is [1, 0], the decoder 216 sets the selection signal S1 to the L level, the selection signal S2 to the H level, and the selection signal S3 to the L level in the cycle T. In this case, the selection circuit 230 selects the trapezoidal waveform Bdp in the cycle T, and as a result, the driving signal VOUT corresponding to the "small dot SD" is output.

Further, when the print data [SIH, SIL] is [0, 1], the decoder 216 sets the selection signal S1 to the L level, the selection signal S2 to the L level, and the selection signal S3 to the L level in the cycle T. In this case, the selection circuit 230 does not perform any of the trapezoidal waveforms Adp, Bdp, and Cdp in the cycle T, and as a result, the driving signal VOUT corresponding to the "non-discharge ND" is output. Here, the driving signal VOUT corresponding to the non-discharge ND has a constant voltage waveform at a voltage Vc. When none of the trapezoidal waveforms Adp, Bdp, and Cdp is selected as the driving signal VOUT, the voltage Vc immediately before is held by the capacity component of the piezoelectric element 60. Therefore, when the selection circuit 230 does not select any of the trapezoidal waveforms Adp, Bdp, and Cdp, this voltage Vc is supplied to the piezoelectric element 60 as the driving signal VOUT.

Further, when the print data [SIH, SIL] is [0, 0], the decoder 216 sets the selection signal S1 to the L level, the selection signal S2 to the L level, and the selection signal S3 to the H level in the cycle T. In this case, the selection circuit 230 selects the trapezoidal waveform Cdp in the cycle T, and as a result, the driving signal VOUT corresponding to the "Micro-vibration BSD" is output.

As described above, the driving signal selection control circuit 200 selects or deselects the driving signals COMA, COMB, and COMC based on the print data signal SI, the latch signal LAT, and the clock signal SCK, to generate the driving signal VOUT corresponding to each of the plurality of discharge sections 600 and output the generated signal to the corresponding discharge section 600. In other words, the driving signal selection control circuit 200 switches whether or not to supply the driving signals COMA, COMB, and COMC as the driving signal VOUT to the piezoelectric element 60 based on the print data signal SI, the latch signal LAT, and the clock signal SCK. The driving signal selection control circuit 200 is an example of a switching circuit, and any one of the print data signal SI, the latch signal LAT, and the clock signal SCK for regulating the operation of the driving signal selection control circuit 200 is an example of a discharge control signal. Further, at least one of the driving signals COMA and COMB for driving the piezoelectric element 60 included in the discharge section 600 such that the ink is discharged from the discharge section 600 is an example of a first driving signal, and the driving signal COMC for driving the piezoelectric element 60 included in the discharge section 600 such that the ink is not discharged from the discharge section 600 is an example of a second driving signal.

Further, as illustrated in FIG. 2, the driving signal COMA is output by the driving signal output circuit 52*a* included in the driving circuit unit 50, the driving signal COMB is output by the driving signal output circuit 52*b* included in the driving circuit unit 50, and the driving signal COMC is output by the driving signal output circuit 52*c* included in the driving circuit unit 50. At least one of the driving signal output circuit 52*a* that outputs the driving signal COMA and the driving signal output circuit 52*b* that outputs the driving signal COMB is an example of a first driving signal output circuit, and the driving signal output circuit 52*c* that outputs the driving signal COMC is an example of a second driving signal output circuit.

3. Structure of Liquid Discharge Head

Figure 8:
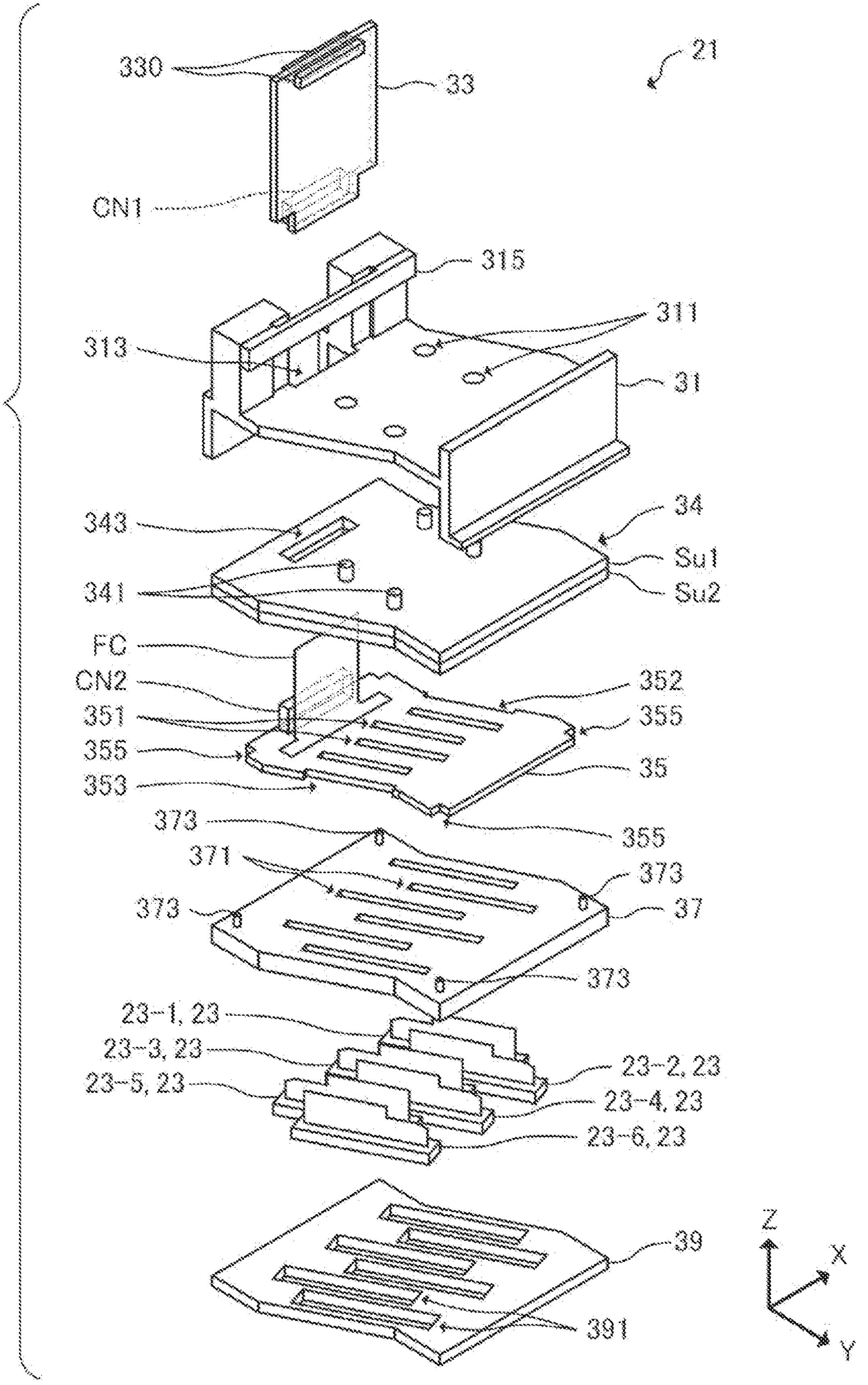
FIG. 8 is an exploded perspective view of a head module.

Next, the structure of the head module 21 will be described. FIG. 8 is an exploded perspective view of the head module 21. FIG. 8 illustrates arrows indicating the X, Y, and Z directions that are orthogonal to each other. Further, in the following description, the starting point side of the arrow indicating the X direction may be referred to as the −X side, and the tip end side thereof may be referred to as the +X side. The starting point side of the arrow indicating the Y direction may be referred to as the −Y side, the tip end side thereof may be referred to as the +Y side. The starting point side of the arrow indicating the Z direction may be referred to as the −Z side, and the tip end side thereof may be referred to as the +Z side.

As illustrated in FIG. 8, the head module 21 includes a housing 31, an aggregate substrate 33, a flow path structure 34, a head substrate 35, a flow path distribution section 37, and a fixing plate 39. Then, the head module 21 is configured such that the flow path structure 34, the head substrate 35, the flow path distribution section 37, and the fixing plate 39 are positioned in a state where the fixing plate 39, the flow path distribution section 37, the head substrate 35, and the flow path structure 34 are stacked in this order from the −Z side to the +Z side in the direction along the Z direction, the housing 31 is positioned around the flow path structure 34, the head substrate 35, the flow path distribution section 37, and the fixing plate 39 so as to support the flow path structure 34, the head substrate 35, the flow path distribution section 37, and the fixing plate 39, and the aggregate substrate 33 is erected on the +Z side of the housing 31 in a state of being held by the housing 31.

Further, as illustrated in FIG. 8, the head module 21 has the plurality of discharge modules 23. The plurality of discharge modules 23 are positioned between the flow path distribution section 37 and the fixing plate 39, and are partially positioned so as to be exposed to the outside of the head module 21. FIG. 8 illustrates a case where the head module 21 has six discharge modules 23. In the following description, when it is necessary to distinguish each of the six discharge modules 23, the six discharge modules 23 may be referred to as discharge modules 23-1 to 23-6. The number of discharge modules 23 included in the head module 21 is not limited to six.

Figure 9:
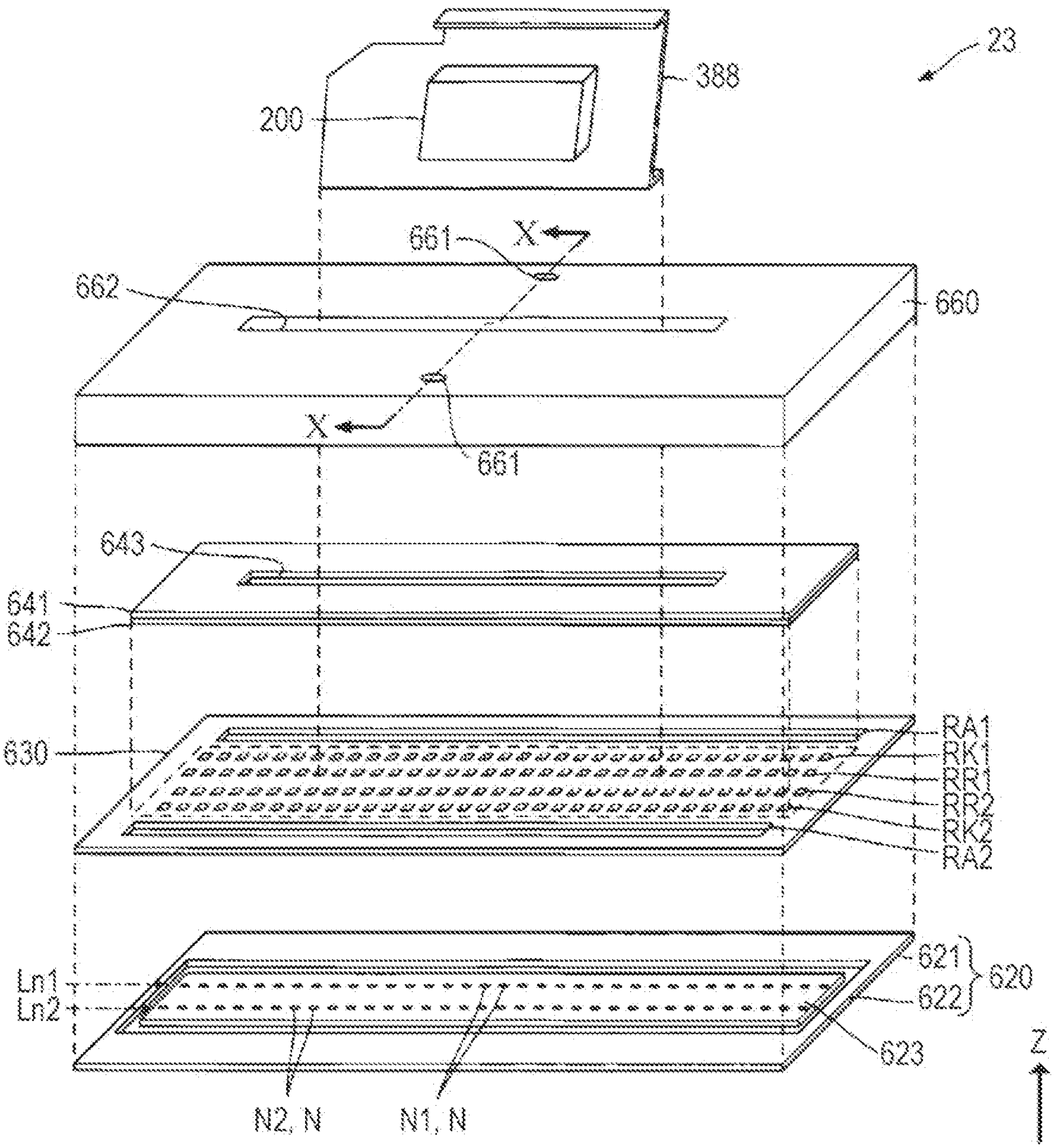
FIG. 9 is an exploded perspective view of a discharge module.
Figure 10:
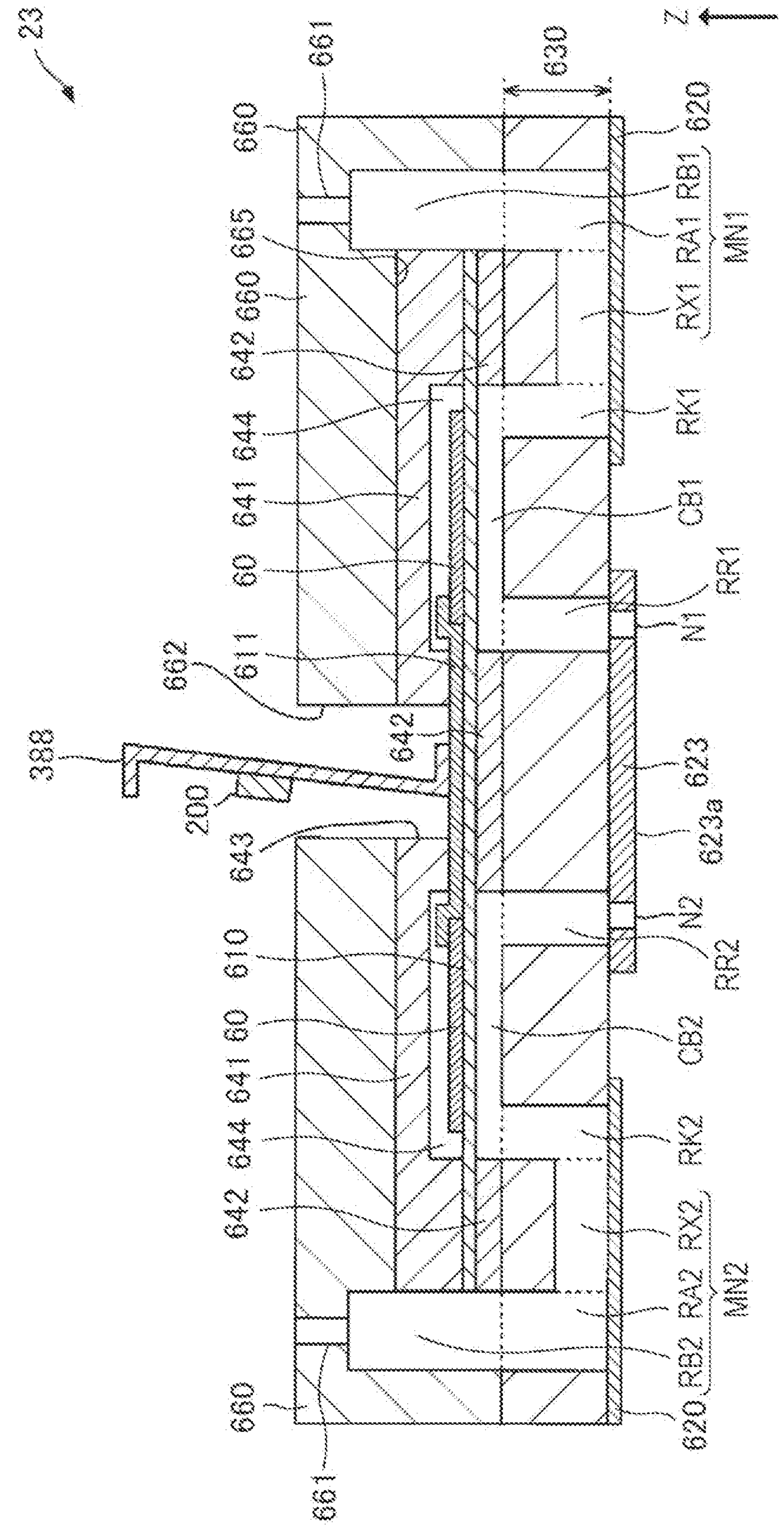
FIG. 10 is a sectional view taken along the line X-X of the discharge module illustrated in FIG. 9.

In describing the details of the configuration of the head module 21 in the present embodiment, first, a specific example of the configuration of the discharge module 23 included in the head module 21 will be described. FIG. 9 is an exploded perspective view of the discharge module 23, and FIG. 10 is a sectional view of the discharge module 23 illustrated in FIG. 9 when the discharge module 23 is taken along the line X-X. Here, the line X-X illustrated in FIG. 9 is a virtual line segment that passes through an introduction path 661 included in the discharge module 23 and passes through a nozzle N1 and a nozzle N2.

As illustrated in FIGS. 9 and 10, the discharge module 23 has the plurality of nozzles N1 arranged side by side and the plurality of nozzles N2 arranged side by side. The total number of the plurality of nozzles N1 and the plurality of nozzles N2 included in the discharge module 23 is n, which is the same as the number of discharge sections 600 included in the discharge module 23. In the present embodiment, the description will be made while the number of nozzles N1 and the number of nozzles N2 included in the discharge module 23 are the same. In other words, the discharge module 23 has n/2 nozzles N1 and n/2 nozzles N2. In the following description, when it is not necessary to distinguish the nozzle N1 and the nozzle N2 from each other, the nozzle N1 and the nozzle N2 may be simply referred to as a nozzle N.

As illustrated in FIGS. 9 and 10, the discharge module 23 includes a wiring member 388, a case 660, a protective substrate 641, a flow path forming substrate 642, a communication plate 630, a compliance substrate 620, and a nozzle plate 623. Each member included in the discharge module 23 is laminated along the Z direction and is joined by an adhesive or the like.

On the flow path forming substrate 642, pressure chambers CB1 partitioned by a plurality of partition walls by anisotropic etching from one surface side are arranged side by side corresponding to the nozzles N1, and pressure chambers CB2 partitioned by a plurality of partition walls by anisotropic etching from one surface side are arranged side by side corresponding to the nozzles N2. In other words, on the flow path forming substrate 642, a row of pressure chambers CB1 arranged side by side corresponding to n/2 nozzles N1 and a row of pressure chambers CB2 arranged side by side corresponding to n/2 nozzles N2 are provided. Here, in the following description, when it is not necessary to distinguish the pressure chamber CB1 and the pressure chamber CB2 from each other, the pressure chamber CB1 and the pressure chamber CB2 may be simply referred to as a pressure chamber CB. Further, the flow path forming substrate 642 may be provided with a supply path or the like on one end portion side of the pressure chamber CB such that the opening area is narrower than that of the pressure chamber CB and the flow path resistance of the ink flowing into the pressure chamber CB is imparted.

The nozzle plate 623 is positioned on the −Z side of the flow path forming substrate 642. The nozzle plate 623 is provided with a nozzle row Ln1 formed by n/2 nozzles N1 and a nozzle row Ln2 formed by n/2 nozzles N2. Here, in the following description, the −Z side surface of the nozzle plate 623 where the nozzles N are open may be referred to as a liquid ejection surface 623*a*.

The communication plate 630 is positioned on the −Z side of the flow path forming substrate 642 and on the +Z side of the nozzle plate 623. The communication plate 630 is provided with a nozzle communication path RR1 that makes the pressure chamber CB1 and the nozzle N1 communicate with each other, and a nozzle communication path RR2 that makes the pressure chamber CB2 and the nozzle N2 communicate with each other. Further, on the communication plate 630, a pressure chamber communication path RK1 that makes the end portion of the pressure chamber CB1 and a manifold MN1 (which will be described later) communicate with each other, and a pressure chamber communication path RK2 that makes the end portion of the pressure chamber CB2 and a manifold MN2 (which will be described later)

communicate with each other, are provided independently corresponding to each of the pressure chambers CB1 and CB2. In other words, on the communication plate 630, a row of the nozzle communication paths RR1 corresponding to n/2 nozzles N1 arranged side by side and the pressure chamber CB1, a row of the pressure chamber communication paths RK1, a row of nozzle communication paths RR2 corresponding to n/2 nozzles N2 arranged side by side and the pressure chamber CB2, and a row of pressure chamber communication paths RK2 are provided.

Further, the communication plate 630 includes the manifolds MN1 and MN2. The manifold MN1 includes a supply communication path RA1 and a coupling communication path RX1. The supply communication path RA1 is provided so as to penetrate the communication plate 630 in the Z direction, and the coupling communication path RX1 is provided to be open on the nozzle plate 623 side of the communication plate 630 in the middle of the Z direction without penetrating the communication plate 630 in the Z direction. Similarly, the manifold MN2 includes a supply communication path RA2 and a coupling communication path RX2. The supply communication path RA2 is provided so as to penetrate the communication plate 630 in the Z direction, and the coupling communication path RX2 is provided to be open on the nozzle plate 623 side of the communication plate 630 in the middle of the Z direction without penetrating the communication plate 630 in the Z direction. Then, the coupling communication path RX1 included in the manifold MN1 is communicated with the corresponding pressure chamber CB1 by the pressure chamber communication path RK1, and the coupling communication path RX2 included in the manifold MN2 is communicated with the corresponding pressure chamber CB2 by the pressure chamber communication path RK2.

Here, in the following description, when it is not necessary to distinguish the nozzle communication path RR1 and the nozzle communication path RR2 from each other, the nozzle communication path RR1 and the nozzle communication path RR2 may be simply referred to as a nozzle communication path RR. When it is not necessary to distinguish the manifold MN1 and the manifold MN2 from each other, the manifold MN1 and the manifold MN2 may be simply referred to as a manifold MN, and when it is not necessary to distinguish the supply communication path RA1 and the supply communication path RA2 from each other, the supply communication path RA1 and the supply communication path RA2 may be simply referred to as a supply communication path RA, and when it is not necessary to distinguish the coupling communication path RX1 and the coupling communication path RX2 from each other, the coupling communication path RX1 and the coupling communication path RX2 may be simply referred to as the coupling communication path RX.

A vibrating plate 610 is positioned on the +Z side surface of the flow path forming substrate 642. Further, on the +Z side surface of the vibrating plate 610, the piezoelectric elements 60 are formed in two rows corresponding to the nozzles N1 and N2. One electrode of the piezoelectric element 60 and the piezoelectric layer are formed for each pressure chamber CB, and the other electrode is configured as a common electrode common to the pressure chamber CB. Then, the driving signal VOUT is supplied from the driving signal selection control circuit 200 to one electrode of the piezoelectric element 60, and the reference voltage signal VBS is supplied to the common electrode which is the other electrode.

Further, the protective substrate 641 having substantially the same size as that of the flow path forming substrate 642 is joined to the +Z side surface of the flow path forming substrate 642. The protective substrate 641 forms a holding section 644 which is a space for protecting the piezoelectric element 60. Further, the protective substrate 641 is provided with a through-hole 643 that penetrates along the Z direction. The end portion of a lead electrode 611 drawn out of the electrode of the piezoelectric element 60 is extended so as to be exposed in the through-hole 643. A wiring member 388 is electrically coupled to the end portion of the lead electrode 611 exposed in the through-hole 643.

Further, a case 660 defining a part of the manifold MN that communicates with the plurality of pressure chambers CB is fixed to the protective substrate 641 and the communication plate 630. The case 660 has substantially the same shape as that of the communication plate 630 in a plan view, and is joined to the protective substrate 641 and also to the communication plate 630. Specifically, the case 660 has a recess portion 665 having a depth for accommodating the flow path forming substrate 642 and the protective substrate 641 on the −Z side surface. The recess portion 665 has a wider opening area than that of the surface on which the protective substrate 641 is joined to the flow path forming substrate 642. Then, in a state where the flow path forming substrate 642 or the like is accommodated in the recess portion 665, the opening surface of the recess portion 665 on the −Z side is sealed by the communication plate 630. Accordingly, the supply communication path RB1 and the supply communication path RB2 are defined by the case 660, the flow path forming substrate 642, and the protective substrate 641 on the outer peripheral portion of the flow path forming substrate 642. Here, when it is not necessary to distinguish the supply communication path RB1 and the supply communication path RB2 from each other, the supply communication path RB1 and the supply communication path RB2 may be simply referred to as a supply communication path RB.

Further, the compliance substrate 620 is provided on the surface of the communication plate 630 where the supply communication path RA and the coupling communication path RX are open. The compliance substrate 620 seals the openings of the supply communication path RA and the coupling communication path RX. The compliance substrate 620 has a sealing film 621 and a fixed substrate 622. The sealing film 621 is formed of a flexible thin film or the like, and the fixed substrate 622 is formed of a hard material such as a metal such as stainless steel.

Further, the case 660 is provided with the introduction path 661 for supplying ink to the manifold MN. In addition, the case 660 is provided with a coupling port 662 in which the wiring member 388 is inserted so as to communicate with the through-hole 643 of the protective substrate 641. The coupling port 662 is an opening that penetrates along the Z direction.

The wiring member 388 is a flexible substrate for electrically coupling the discharge module 23 and the head substrate 35 (which will be described later) to each other, and is, for example, a flexible substrate such as a flexible printed circuits (FPC). The driving signal selection control circuit 200 configured with, for example, an integrated circuit, is mounted on the wiring member 388 by chip on film (COF).

In the discharge module 23 configured as described above, the driving signal VOUT output by the driving signal selection control circuit 200 and the reference voltage signal VBS are supplied to the piezoelectric element 60 via the wiring member 388. The piezoelectric element 60 is driven by a change in the potential of the driving signal VOUT. Then, as the piezoelectric element 60 is driven, the vibrating plate 610 is deformed in the up-down direction, and the internal pressure of the pressure chamber CB changes. Due to the change in the internal pressure of the pressure chamber CB, the ink stored inside the pressure chamber CB is discharged from the corresponding nozzle N. In the discharge module 23 configured as described above, the configuration including the nozzle N, the nozzle communication path RR, the pressure chamber CB, the piezoelectric element 60, and the vibrating plate 610 corresponds to the discharge section 600. In other words, the discharge section 600 includes the piezoelectric element 60 driven by the driving signal VOUT based on the driving signals COMA and COMB, and discharges ink in response to the drive of the piezoelectric element 60.

Returning to FIG. 8, the fixing plate 39 is positioned on the −Z side of the discharge module 23. The fixing plate 39 has six exposed opening portions 391 penetrating the fixing plate 39 in the Z direction. Then, the six discharge modules 23 are fixed to the fixing plate 39 such that the liquid ejection surface 623*a* included in the six discharge modules 23 is exposed from each of the corresponding six exposed opening portions 391.

The flow path distribution section 37 is positioned on the +Z side of the discharge module 23. Four introduction coupling sections 373 are provided on the +Z side surface of the flow path distribution section 37. The four introduction coupling sections 373 are flow path pipes that protrude from the +Z side surface of the flow path distribution section 37 toward the +Z side along the Z direction, and communicate with a flow path holes (not illustrated) formed on the −Z side surface of the flow path structure 34 (which will be described later). Further, on the −Z side surface of the flow path distribution section 37, a flow path pipe (not illustrated) that communicates with the corresponding introduction coupling section 373 among the four introduction coupling sections 373 is positioned. A flow path pipe (not illustrated) positioned on the −Z side surface of the flow path distribution section 37 is coupled to the introduction path 661 included in each of the six discharge modules 23. Further, the flow path distribution section 37 has six opening portions 371 that penetrate in the Z direction. The wiring member 388 included in each of the six discharge modules 23 is inserted through the six opening portions 371.

The head substrate 35 is positioned on the +Z side of the flow path distribution section 37. The head substrate 35 is provided with the connector CN1 that is electrically coupled to the aggregate substrate 33 (which will be described later) and a cable FC. Further, on the head substrate 35, four opening portions 351 and two notch sections 353 are formed. The wiring member 388 of the discharge modules 23-2 to 23-5 is inserted through the four opening portions 351. Then, each of the wiring members 388 of the discharge modules 23-2 to 23-5 through which the four opening portions 351 are inserted is electrically coupled to the head substrate 35 by solder or the like. Further, the wiring member 388 included in the discharge module 23-1 passes through one of the two notch sections 353, and the wiring member 388 included in the discharge module 23-6 passes through the other one of the two notch sections 353. Then, the wiring member 388 included in each of the discharge modules 23-1 and 23-6, through which each of the two notch sections 353 pass, is electrically coupled to the head substrate 35 by solder or the like. In other words, the head substrate 35 branches the signal input via the connector CN1 and the cable FC corresponding to each of the discharge modules 23-1 to 23-6, and signals output by each of the discharge modules 23-1 to 23-6 are output to the aggregate substrate 33 (which will be described later) via the connector CN1 and the cable FC.

Further, four notch sections 355 are formed at the four corners of the head substrate 35. The four introduction coupling sections 373 included in the flow path distribution section 37 positioned on the −Z side of the head substrate 35 pass through the four notch sections 355. Then, the four introduction coupling sections 373 that passed through the notch section 355 are coupled to the flow path structure 34 positioned on the +Z side of the head substrate 35.

The flow path structure 34 is positioned on the +Z side of the head substrate 35. The flow path structure 34 has a flow path plate Su1 and a flow path plate Su2 laminated along the Z direction. The flow path plate Su1 and the flow path plate Su2 are joined to each other by an adhesive or the like in a state where the flow path plate Su1 is positioned on the +Z side and the flow path plate Su2 is positioned on the −Z side. The flow path plate Su1 and the flow path plate Su2 are formed, for example, by injection molding of a resin.

Further, the flow path structure 34 has four supply coupling sections 341 which are flow path pipes protruding toward the +Z side along the Z direction on the +Z side surface. The four supply coupling sections 341 communicate with the flow path holes (not illustrated) formed on the −Z side surface of the flow path structure 34 via the ink flow path formed inside the flow path structure 34. Further, the flow path structure 34 is formed with a through-hole 343 that penetrates along the Z direction. The connector CN1 and the cable FC provided on the head substrate 35 are inserted through the through-hole 343. Inside the flow path structure 34, in addition to the ink flow path that makes the supply coupling section 341 and the flow path hole (not illustrated) formed on the −Z side surface communicate with each other, a filter or the like for capturing foreign matter included in the ink may be provided.

The housing 31 is positioned so as to cover the periphery of the flow path structure 34, the head substrate 35, the flow path distribution section 37, and the fixing plate 39, and supports the flow path structure 34, the head substrate 35, the flow path distribution section 37, and the fixing plate 39. The housing 31 has four supply holes 311 and an aggregate substrate insertion section 313, and holding members 315 and 317.

The four supply coupling sections 341 included in the flow path structure 34 are inserted through each of the four supply holes 311. Then, ink is supplied from the liquid container 2 to the four supply coupling sections 341 through which the four supply holes 311 are inserted, via a tube (not illustrated) or the like.

The holding members 315 and 317 sandwich and hold the aggregate substrate 33 in a state where a part of the aggregate substrate 33 is inserted through the aggregate substrate insertion section 313. The aggregate substrate 33 is provided with the connectors CN1 and 330. Various signals such as the data signal DATA, the driving signals COMA, COMB, and COMC, the reference voltage signal VBS, and other power supply voltages, which are output by the control unit 10, are input to the connector 330. The connector CN1 is inserted through the aggregate substrate insertion section 313 of the housing 31 together with the aggregate substrate 33, and is electrically coupled to the connector CN2 included in the head substrate 35. Further, the cable FC included in the head substrate 35 is electrically coupled to the aggregate substrate 33. Accordingly, the aggregate substrate 33 and the head substrate 35 are electrically coupled to each other. The details of the electrical coupling between the aggregate substrate 33 and the head substrate 35 will be described later.

In the head module 21 configured as described above, the liquid container 2 and the supply coupling section 341 communicate with each other via a tube or the like (not illustrated), and accordingly, the ink stored in the liquid container 2 is supplied to the head module 21. The ink supplied to the head module 21 is guided to the flow path hole (not illustrated) formed on the −Z side surface of the flow path structure 34 via the ink flow path formed inside the flow path structure 34. The ink guided to the flow path hole (not illustrated) formed on the −Z side surface of the flow path structure 34 is supplied to the four introduction coupling sections 373 included in the flow path distribution section 37.

The ink supplied to the flow path distribution section 37 via the four introduction coupling sections 373 is supplied to the introduction path 661 included in the corresponding discharge module 23 after the ink is distributed corresponding to each of the six discharge modules 23 in the ink flow path (not illustrated) formed inside the flow path distribution section 37. Then, the ink supplied to the discharge module 23 via the introduction path 661 is stored in the pressure chamber CB included in the discharge section 600.

Further, the control unit 10 and the head module 21 are electrically coupled to each other by a cable (not illustrated). Then, various signals including the driving signals COMA, COMB, and COMC, the reference voltage signal VBS, and the data signal DATA are input from the control unit 10 to the head module 21 via the cable. Various signals including the driving signals COMA, COMB, and COMC, the reference voltage signal VBS, and the data signal DATA input to the head module 21 propagate through the aggregate substrate 33 and the head substrate 35, and are supplied to the discharge module 23. Then, in the discharge module 23, the driving signals COMA, COMB, and COMC corresponding to each of the n discharge sections 600 and the driving signal VOUT based on the data signal DATA are generated, and are supplied to the piezoelectric element 60 included in the corresponding discharge section 600. Accordingly, the piezoelectric element 60 is driven based on the driving signal VOUT. Then, in response to the drive of the piezoelectric element 60, the ink stored in the pressure chamber CB included in the discharge section 600 is discharged.

4. Electrical Coupling Between Aggregate Substrate and Head Substrate

Figure 11:
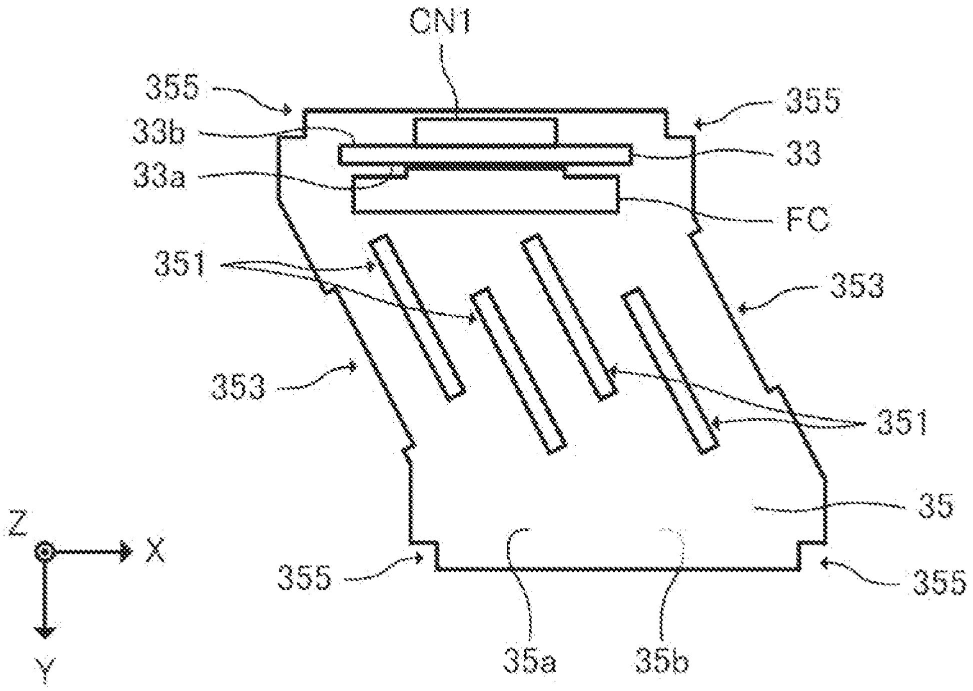
FIG. 11 is a view illustrating an example of an electrical coupling between an aggregate substrate and a head substrate when the head module is viewed from a direction along a Z direction.

Here, in the head module 21, a specific example of the electrical coupling between the aggregate substrate 33 and the head substrate 35, and a propagation path for propagating various signals including the clock signal SCK, the print data signal SI, the latch signal LAT, and the driving signals COMA, COMB, and COMC will be described. FIG. 11 is a view illustrating an example of the electrical coupling between the aggregate substrate 33 and the head substrate 35 when the head module 21 is viewed from the direction along the Z direction, FIG. 12 is a view illustrating an example of the electrical coupling between the aggregate substrate 33 and the head substrate 35 when the head module 21 is viewed from the direction along the Y direction, and FIG. 13 is a view illustrating an example of the electrical coupling between the aggregate substrate 33 and the head substrate 35 when the head module 21 is viewed from the direction along the X direction.

Figure 12:
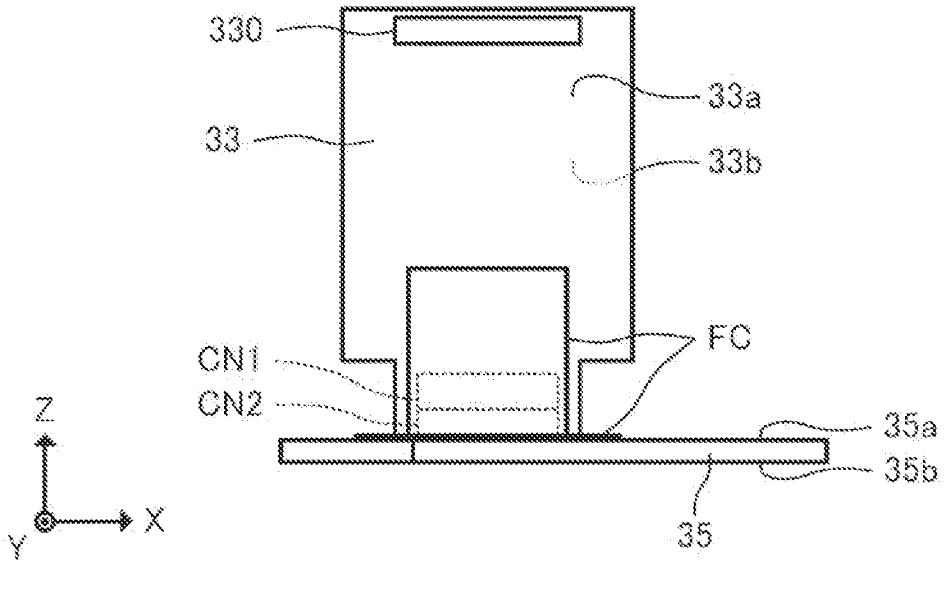
FIG. 12 is a view illustrating an example of an electrical coupling between the aggregate substrate and the head substrate when the head module is viewed from a direction along a Y direction.
Figure 13:
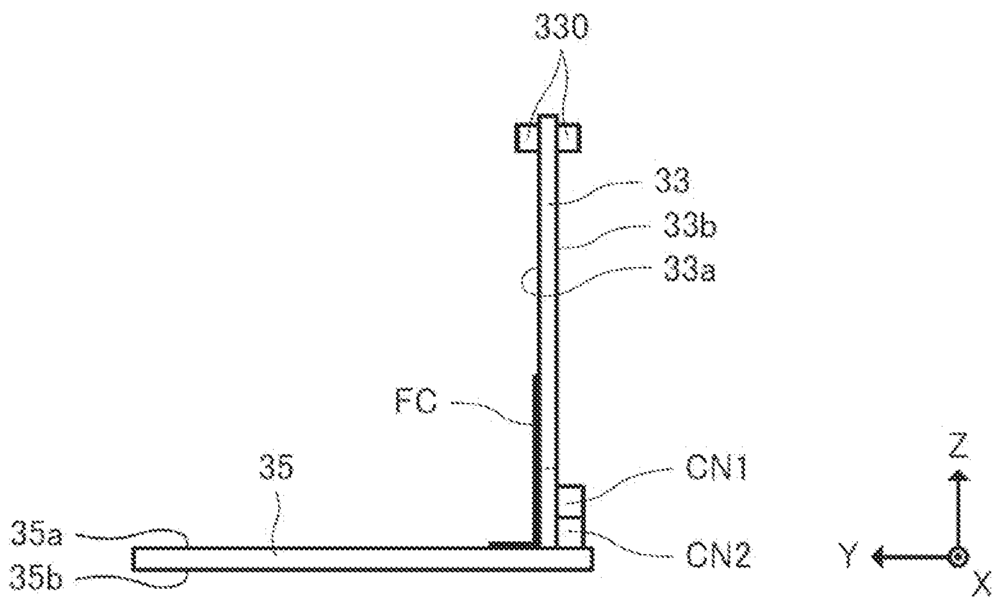
FIG. 13 is a view illustrating an example of an electrical coupling between the aggregate substrate and the head substrate when the head module is viewed from a direction along an X direction.

As illustrated in FIGS. 11 to 13, the head substrate 35 has a surface 35*a* and a surface 35*b*. The head substrate 35 is positioned such that the surface 35*a* and the surface 35*b* extend along a plane formed by the X direction and the Y direction, the surface 35*a* is on the +Z side, and the surface 35*b* is on the −Z side. At the center portion of the head substrate 35, four opening portions 351 penetrating the surface 35*a* and the surface 35*b* are formed side by side along the X direction. Further, a notch section 353 is formed on each of the +X side of the four opening portions 351 formed side by side and the −X side of the four opening portions 351 formed side by side. In other words, on the head substrate 35, four opening portions 351 are formed between the two notch sections 353 in the direction in which the two notch sections 353 and the four opening portions 351 are along the X direction.

Then, as described above, the head substrate 35 is electrically coupled to the six discharge modules 23 via the wiring member 388 through which the two notch sections 353 and the four opening portions 351 which are formed on the head substrate 35 are inserted. In other words, the head substrate 35 propagates the driving signals COMA, COMB, and COMC, the print data signal SI, the latch signal LAT, and the clock signal SCK to the driving signal selection control circuit 200 mounted on the wiring member 388 included in the discharge module 23 by COF. This head substrate 35 is an example of a first substrate.

Further, the connectors CN1 and CN2, the cable FC, and the aggregate substrate 33 are positioned on the −Y side of the four opening portions 351 arranged side by side along the X direction.

The aggregate substrate 33 has a surface 33*a* and a surface 33*b*. In addition, the aggregate substrate 33 is positioned such that the surface 33*a* and the surface 33*b* extend along a plane formed by the X direction and the Z direction, the surface 33*a* is on the +Y side, and the surface 33*b* is on the −Y side. In other words, the aggregate substrate 33 and the head substrate 35 are positioned such that the surface 33*a* of the aggregate substrate 33 and the surface 35*a* of the head substrate 35 intersect with each other. The aggregate substrate 33 is provided with two connectors 330. In the two connectors 330, one connector 330 is provided on the surface 33*a* and the other connector 330 is provided on the surface 33*b* along the side of the aggregate substrate 33 on the +Z side. A cable (not illustrated) electrically coupled to the control unit 10 is attached to the two connectors 330. Here, as the cable attached to the connector 330, for example, a flexible flat cable (FFC) is used.

The cable FC and the connectors CN1 and CN2 electrically couples the aggregate substrate 33 and the head substrate 35 to each other.

One end of the cable FC is electrically coupled to the surface 35*a* of the head substrate 35, and the other end is electrically coupled to the surface 33*a* of the aggregate substrate 33. Then, the cable FC supplies the signal propagating through the aggregate substrate 33 to the head substrate 35. As the cable FC, for example, a flexible printed circuit (FPC) on which a plurality of propagation wirings is formed is used. Generally, in FPC, a copper foil having a thickness of 10 μm to 20 μm is formed on a base such as a PET film or a polyimide film having a thickness of 10 μm to 50 μm, and by performing etching with respect to the copper foil or the like, a wiring pattern having a thickness of 30 μm to 150 μm is formed on the base. The FPC is configured by protecting the wiring pattern formed on the substrate with a film such as a polyimide film or a solder resist having a thickness of 10 μm to 50 μm. In other words, in FPC, fine wiring patterns having a cross-sectional area of 0.0003 to 0.0025 $mm^2$ are formed at high density.

In addition to the base, the wiring pattern, and the film which are described above, the thickness including an adhesive that adheres the base, the wiring pattern, and the film is an extremely thin thickness of generally 100 μm or less, and thus, the FPC can be bent, and can electrically couple the substrate to be coupled with a high degree of freedom. Furthermore, the FPC can form a high-density wiring pattern as described above, and even when the FPC is bent, the rate of change in the electrical characteristics of the wiring pattern is small, and thus, it is possible to propagate many signals with high reliability.

As described above, the cable FC includes a wiring pattern that electrically couples the aggregate substrate 33 and the head substrate 35 to each other. Here, the cable FC may electrically couple the head substrate 35 and the aggregate substrate 33 to each other by coupling the head substrate 35 and the aggregate substrate 33 to each other by, for example, soldering, and may electrically couple the head substrate 35 and the aggregate substrate 33 to each other by electrically coupling the head substrate 35 and the aggregate substrate 33 to each other via the connector (not illustrated). Here, the cable FC that electrically couples the aggregate substrate 33 and the head substrate 35 to each other is an example of a second coupling member, and the wiring pattern included in the cable FC is an example of a second conductive section.

The connector CN1 is electrically coupled to the surface 33*b* of the aggregate substrate 33. Further, the connector CN2 is positioned on the −Y side of the aggregate substrate 33 and is electrically coupled to the surface 35*a* of the head substrate 35. Then, when the connector CN1 and the connector CN2 are fitted to each other, the connector CN1 and the connector CN2 are electrically coupled to each other, and the aggregate substrate 33 provided with the connector CN1 and the head substrate 35 provided with the connector CN2 are electrically coupled to each other. In other words, the connectors CN1 and CN2 are directly fitted without a cable or the like to electrically couple the aggregate substrate 33 and the head substrate 35 to each other.

Here, a specific example of the structure of the connectors CN1 and CN2 will be described. In the present embodiment, in the description, the connector CN1 is a right angle type male connector and the connector CN2 is a straight type female connector. However, the connector CN1 may be a female connector and the connector CN2 may be a male connector. Further, the connector CN1 may be a straight type and the connector CN2 may be a right angle type. Furthermore, the aggregate substrate 33 and the head substrate 35 may be coupled to each other in a stack, and in this case, both the connectors CN1 and CN2 may be a straight type.

An example of the structure of the connector CN1 will be described with reference to FIGS. 14 to 16. In order to describe the structure of the connector CN1 with reference to FIGS. 14 to 16, in FIGS. 14 to 16, arrows indicating the P1 direction, the Q1 direction, and the R1 direction, which are orthogonal to each other, are illustrated. Further, in the following description, the starting point side of the arrow indicating the P1 direction may be referred to as the −P1 side, and the tip end side thereof may be referred to as the +P1 side. The starting point side of the arrow indicating the Q1 direction may be referred to as the −Q1 side, the tip end side thereof may be referred to as the +Q1 side. The starting point side of the arrow indicating the R1 direction may be referred to as the −R1 side, and the tip end side thereof may be referred to as the +R1 side.

Figure 14:
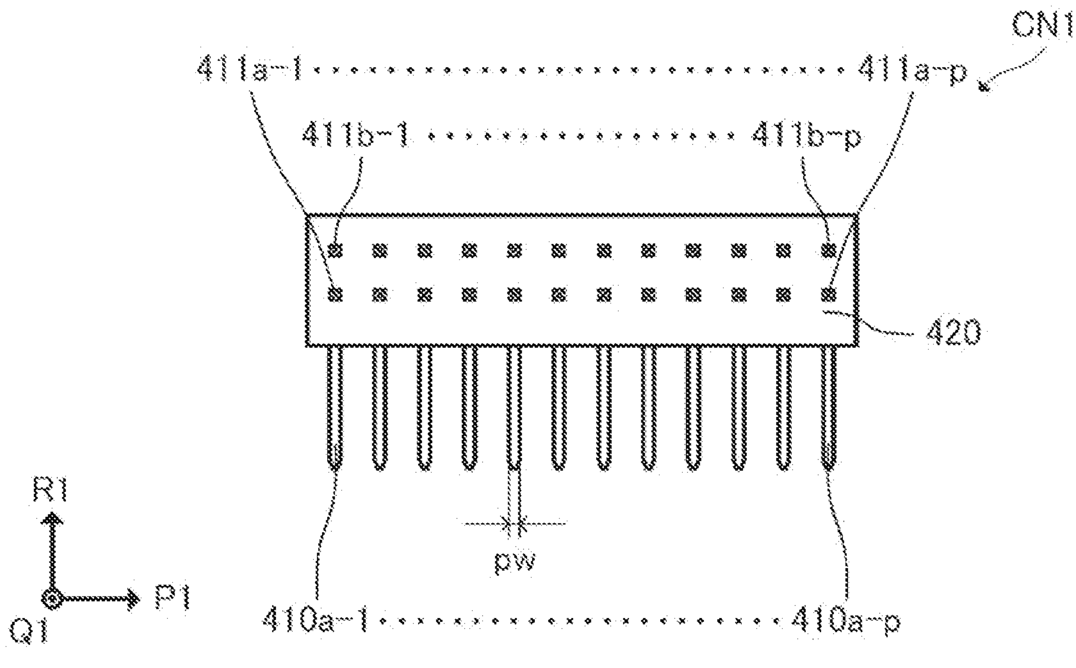
FIG. 14 is a view illustrating an example of a structure of a connector when the connector is viewed from a direction along a Q1 direction.
Figure 15:
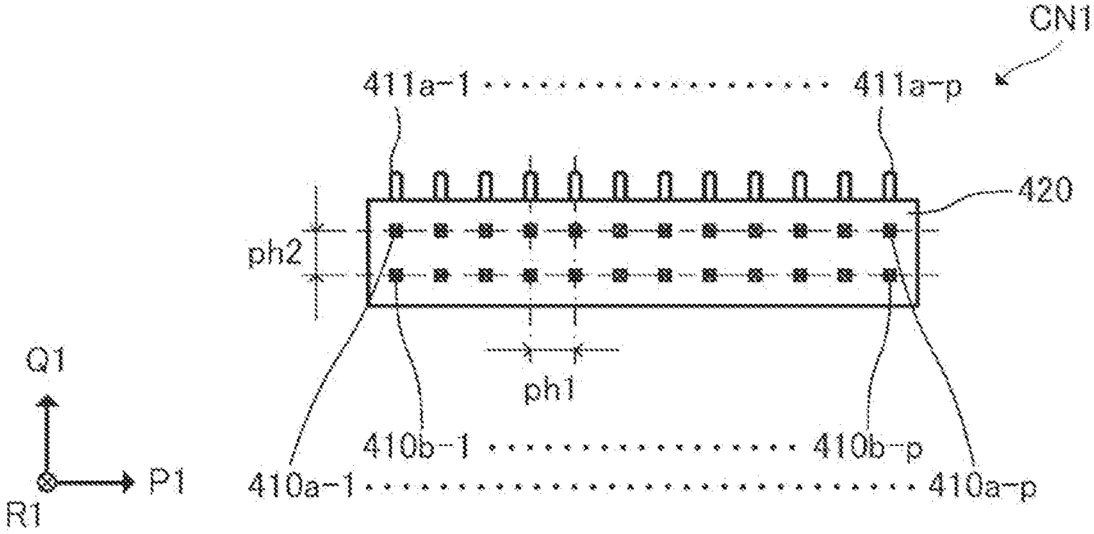
FIG. 15 is a view illustrating an example of a structure of the connector when the connector is viewed from a direction along an R1 direction.
Figure 16:
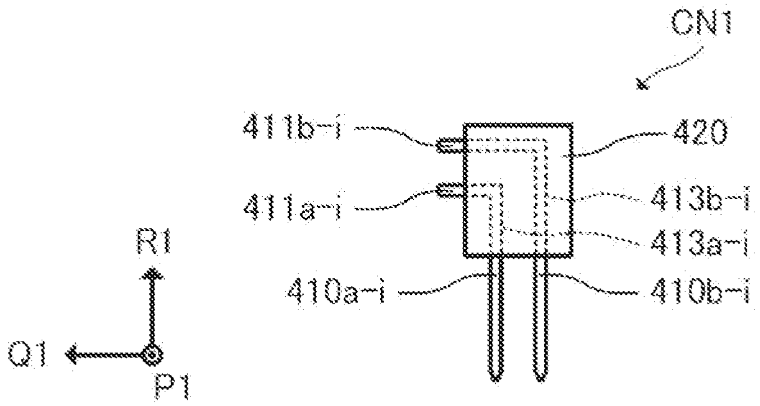
FIG. 16 is a view illustrating an example of a structure of the connector when the connector is viewed from a direction along a P1 direction.

FIG. 14 is a view illustrating an example of the structure of the connector CN1 when the connector CN1 is viewed from the direction along the Q1 direction, FIG. 15 is a view illustrating an example of the structure of the connector CN1 when the connector CN1 is viewed from the direction along the R1 direction, and FIG. 16 is a view illustrating an example of the structure of the connector CN1 when the connector CN1 is viewed from the direction along the P1 direction.

As illustrated in FIGS. 14 to 16, the connector CN1 includes insertion pins 410*a*-1 to 410*a*-*p* and 410*b*-1 to 410*b*-*p*, substrate coupling terminals 411*a*-1 to 411*a*-*p* and 411*b*-1 to 411*b*-*p*, and a holding member 420.

The insertion pins 410*a*-1 to 410*a*-*p* and 410*b*-1 to 410*b*-*p* are rectangular coupling pins having conductivity having a width pw on one side, and each of the insertion pins extends to the −R1 side from the −R1 side surface of the connector CN1. The insertion pins 410*a*-1 to 410*a*-*p* and 410*b*-1 to 410*b*-*p* may be conductive coupling pins on a cylinder of which the diameter has the width pw.

The insertion pins 410*a*-1 to 410*a*-*p* are arranged side by side at equal intervals to be separated from each other with an inter-pitch distance ph1, from the −P1 side to the +P1 side in the order of the insertion pins 410*a*-1, 410*a*-2, . . . , and 410*a*-*p*, in the direction along the P1 direction. The insertion pins 410*b*-1 to 410*b*-*p* are arranged side by side at equal intervals to be separated from each other with the inter-pitch distance ph1, from the −P1 side to the +P1 side in the order of the insertion pins 410*b*-1, 410*b*-2, . . . , and 410*b*-*p*, in the direction along the P1 direction, on the −Q1 side of the insertion pins 410*a*-1 to 410*a*-*p*, which are arranged side by side along the P1 direction. Here, the fact that the insertion pins are arranged side by side at equal intervals to be separated from each other with the inter-pitch distance ph1 includes a case of being arranged at equal intervals including variations and the like.

Further, the insertion pin 410*a*-1 and the insertion pin 410*b*-1 are arranged side by side to be separated from each other with an inter-pitch distance ph2 in the direction along the Q1 direction, the insertion pin 410*a*-*p* and the insertion pin 410*b*-*p* are arranged side by side to be separated from each other with the inter-pitch distance ph2 in the direction along the Q1 direction, and an insertion pin 410*a*-*i* (i is any of 1 to p) and an insertion pin 410*b*-*i* are arranged side by side to be separated from each other with the inter-pitch distance ph2 in the direction along the Q1 direction.

Here, in the connector CN1 of the present embodiment, the shortest distance between the insertion pin 410*a*-*i* and the insertion pin 410*a*-*i*+1 positioned adjacent to the insertion pin 410*a*-*i* is preferably 1 mm or more, and the cross-sectional area of the insertion pin 410*a*-*i* and the insertion pin 410*a*-*i*+1 is preferably 0.1 $mm^2$ or more. Furthermore, the insertion pin 410*a*-*i* and the insertion pin 410*a*-*i*+1 are preferably positioned such that the shortest distance between the insertion pin 410*a*-*i* and the insertion pin 410*a*-*i*+1 is three times or more the width pw of the insertion pin 410*a*-*i* and the insertion pin 410*a*-*i*+1.

In the connector CN1, as an example in which the arrangement and dimensions of the insertion pins 410*a*-1 to 410*a*-*p* and 410*b*-1 to 410*b*-*p* satisfy the above-described conditions, a case where the inter-pitch distance ph1 and the inter-pitch distance ph2 are 2.54 mm and the width pw of the insertion pins 410*a*-1 to 410*a*-*p* and 410*b*-1 to 410*b*-*p* is 0.635 mm. In this case, the shortest distance between the insertion pin 410*a*-*i* and the insertion pin 410*a*-*i*+1 positioned adjacent to the insertion pin 410*a*-*i* is "2.54 mm−0.635 mm=1.905 mm", and the cross-sectional areas of the insertion pins 410*a*-1 to 410*a*-*p* and 410*b*-1 to 410*b*-*p* are "0.635 mm×0.635 mm=0.403 $mm^2$". The inter-pitch distance ph1 and the inter-pitch distance ph2 are not limited to 2.54 mm, and the width pw of the insertion pins 410*a*-1 to 410*a-p* and 410*b*-1 to 410*b-p* is not limited to 0.635 mm.

The substrate coupling terminals 411*a*-1 to 411*a-p* and 411*b*-1 to 411*b-p* are conductive members which are respectively provided on the +Q1 side surface of the connector CN1, and extend to protrude to the +Q1 side along the Q1 direction. The substrate coupling terminals 411*a*-1 to 411*a-p* and 411*b*-1 to 411*b-p* are inserted through the aggregate substrate 33 and coupled to the aggregate substrate 33 by soldering or the like, and accordingly, the connector CN1 is electrically coupled to the aggregate substrate 33.

The substrate coupling terminals 411*a*-1 to 411*a-p* are provided corresponding to each of the insertion pins 410*a*-1 to 410*a-p*. Each of the substrate coupling terminals 411*a*-1 to 411*a-p* and each of the insertion pins 410*a*-1 to 410*a-p* are electrically coupled to each other via internal electrodes 413*a*-1 to 413*a-p*. Specifically, the substrate coupling terminal 411*a*-1 is electrically coupled to the insertion pin 410*a*-1 via the internal electrode 413*a*-1, the substrate coupling terminal 411*a-p* is electrically coupled to the insertion pin 410*a-p* via the internal electrode 413*a-p*, and the substrate coupling terminal 411*a-i* is electrically coupled to the insertion pin 410*a-i* via the internal electrode 413*a-i*.

The substrate coupling terminals 411*b*-1 to 411*b-p* are provided corresponding to each of the insertion pins 410*b*-1 to 410*b-p*. Each of the substrate coupling terminals 411*b*-1 to 411*b-p* and each of the insertion pins 410*b*-1 to 410*b-p* are electrically coupled to each other via internal electrodes 413*b*-1 to 413*b-p*. Specifically, the substrate coupling terminal 411*b*-1 is electrically coupled to the insertion pin 410*b*-1 via the internal electrode 413*b*-1, the substrate coupling terminal 411*b-p* is electrically coupled to the insertion pin 410*b-p* via the internal electrode 413*b-p*, and a substrate coupling terminal 411*b-i* is electrically coupled to the insertion pin 410*b-i* via the internal electrode 413*b-i*.

Further, the substrate coupling terminals 411*a*-1 to 411*a-p* are arranged side by side in the order of the substrate coupling terminals 411*a*-1, 411*a*-2, . . . , and 411*a-p* from the −P1 side to the +P1 side in the direction along the P1 direction, and the substrate coupling terminals 411*b*-1 to 411*b-p* are arranged side by side in the order of the substrate coupling terminals 411*b*-1, 411*b*-2, . . . , and 411*b-p* from the −P1 side to the +P1 side in the direction along the P1 direction, on the +R1 side of the substrate coupling terminals 411*a*-1, 411*a*-2, . . . , and 411*a-p* which are arranged side by side in the direction along the P1 direction. The substrate coupling terminal 411*a*-1 and the substrate coupling terminal 411*b*-1 are arranged side by side in the direction along the R1 direction, the substrate coupling terminal 411*a-p* and the substrate coupling terminal 411*b-p* are arranged side by side in the direction along the R1 direction, and the substrate coupling terminal 411*a-i* and the substrate coupling terminal 411*b-i* are arranged side by side in the direction along the R1 direction.

The holding member 420 also functions as an insulating member that holds the insertion pins 410*a*-1 to 410*a-p* and 410*b*-1 to 410*b-p* and the substrate coupling terminals 411*a*-1 to 411*a-p* and 411*b*-1 to 411*b-p* and insulates the insertion pins 410*a*-1 to 410*a-p* and 410*b*-1 to 410*b-p* from each other and the substrate coupling terminals 411*a*-1 to 411*a-p* and 411*b*-1 to 411*b-p* from each other.

As the holding member 420, polybutylene terephthalate (PBT) resin is preferably used. In the liquid discharge apparatus 1, a part of the ink discharged from the discharge section 600 may become mist before landing on the medium P and float as ink mist inside the liquid discharge apparatus 1. Since the ink mist floating inside the liquid discharge apparatus 1 is extremely small, charging is performed by the Lenard effect. Therefore, there is a high concern that ink mist floating inside the liquid discharge apparatus 1 adheres in the vicinity of the discharge section 600 from which the ink is discharged and in the vicinity of the connector included in the head module 21 through which various signals propagate.

In particular, in the liquid discharge apparatus 1, inks having various physical properties can be used depending on the type and application of the medium P. Therefore, it is required that the connector included in the head module 21 is unlikely to change in characteristics even when various types of solvents adhere thereto. As the holding member 420 of the connector CN1 included in the head module 21, a PBT resin having excellent insulation performance, low water absorption rate, and excellent oil resistance and solvent resistance is used, and accordingly, even when the ink used in the liquid discharge apparatus 1 adheres to the connector CN1, the concern that the characteristics of the holding member 420 change is reduced. Therefore, the concern about the change in characteristics of the insertion pins 410*a*-1 to 410*a-p* and 410*b*-1 to 410*b-p* and the substrate coupling terminals 411*a*-1 to 411*a-p* and 411*b*-1 to 411*b-p*, which are held by the holding member 420, is reduced. As a result, the stability of various signals propagating through the insertion pins 410*a*-1 to 410*a-p* and 410*b*-1 to 410*b-p* and the substrate coupling terminals 411*a*-1 to 411*a-p* and 411*b*-1 to 411*b-p* is improved. In other words, when the holding member 420 of the connector CN1 contains the PBT resin, the reliability of various signals propagating through the insertion pins 410*a*-1 to 410*a-p* and 410*b*-1 to 410*b-p* and the substrate coupling terminals 411*a*-1 to 411*a-p* and 411*b*-1 to 411*b-p* is improved.

The connector CN1 configured as described above is a so-called pin header including the insertion pins 410*a*-1 to 410*a-p* and 410*b*-1 to 410*b-p* including the insertion pins 410*a-i* and the insertion pins 410*a-i*+1, and the holding member 420 that holds the insertion pins 410*a*-1 to 410*a-p* and 410*b*-1 to 410*b-p* in a state of being insulated from each other. The connector CN1 is provided on the aggregate substrate 33 such that the P1 direction, the Q1 direction, and the R1 direction illustrated in FIGS. 14 to 16 are respectively directions along each of the X direction, the Y direction, and the Z direction illustrated in FIGS. 11 to 13.

Next, an example of the structure of the connector CN2 will be described with reference to FIGS. 17 to 19. In order to describe the structure of the connector CN2 with reference to FIGS. 17 to 19, in FIGS. 17 to 19, arrows indicating the P2 direction, the Q2 direction, and the R2 direction, which are orthogonal to each other, are illustrated. Further, in the following description, the starting point side of the arrow indicating the P2 direction may be referred to as the −P2 side, and the tip end side thereof may be referred to as the +P2 side. The starting point side of the arrow indicating the Q2 direction may be referred to as the −Q2 side, the tip end side thereof may be referred to as the +Q2 side. The starting point side of the arrow indicating the R2 direction may be referred to as the −R2 side, and the tip end side thereof may be referred to as the +R2 side.

Figure 17:
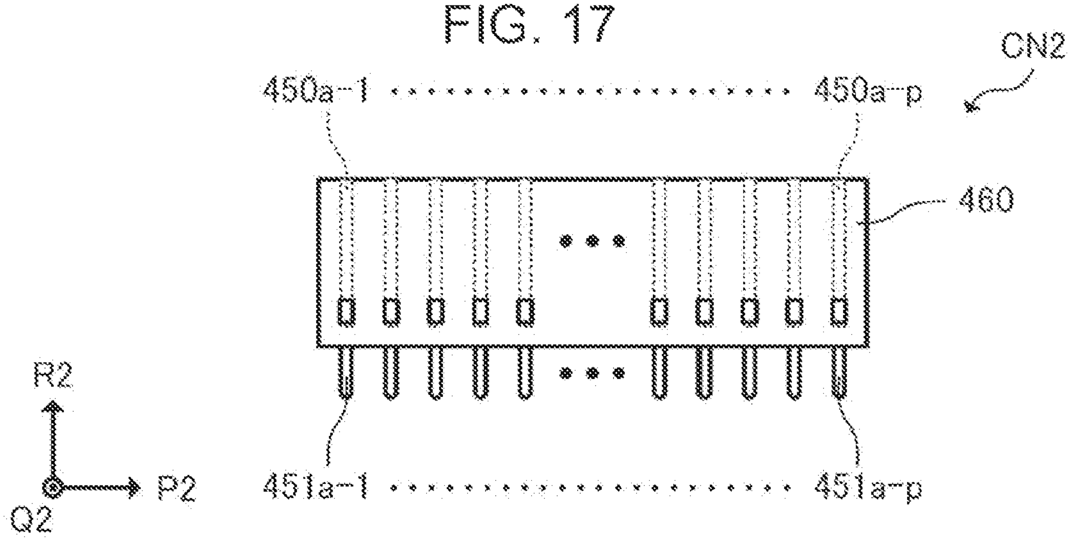
FIG. 17 is a view illustrating an example of a structure of a connector when the connector is viewed from a direction along a Q2 direction.
Figure 18:
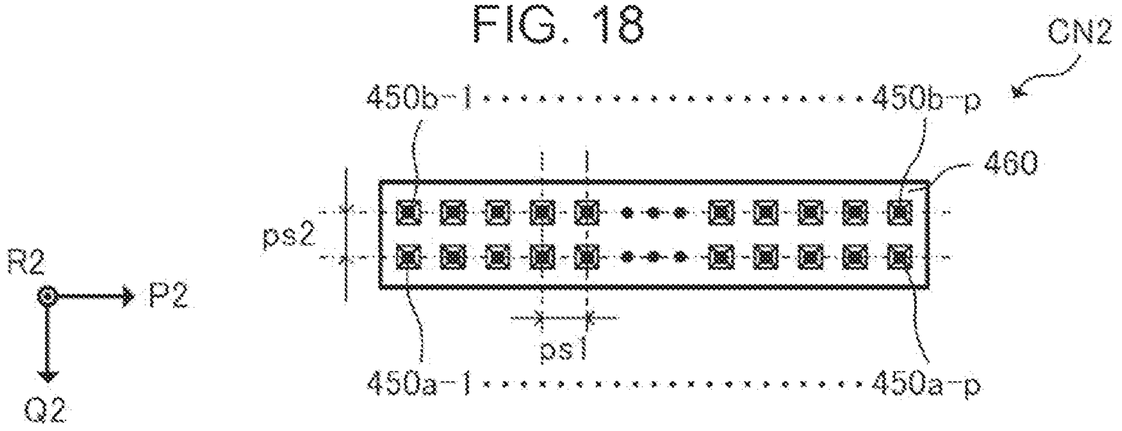
FIG. 18 is a view illustrating an example of a structure of the connector when the connector is viewed from a direction along an R2 direction.
Figure 19:
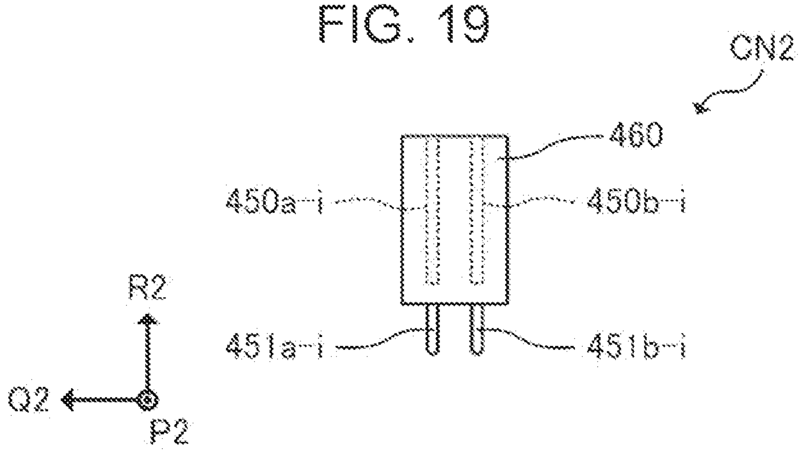
FIG. 19 is a view illustrating an example of a structure of the connector when the connector is viewed from a direction along a P2 direction.

FIG. 17 is a view illustrating an example of the structure of the connector CN2 when the connector CN2 is viewed from the direction along the Q2 direction, FIG. 18 is a view illustrating an example of the structure of the connector CN2 when the connector CN2 is viewed from the direction along the R2 direction, and FIG. 19 is a view illustrating an example of the structure of the connector CN2 when the connector CN2 is viewed from the direction along the P2 direction.

As illustrated in FIGS. 17 to 19, the connector CN2 includes insertion holes 450*a*-1 to 450*a-p* and 450*b*-1 to 450*b-p*, substrate coupling terminals 451*a*-1 to 451*a-p* and 451*b*-1 to 451*b-p*, and a holding member 460.

The insertion holes 450*a*-1 to 450*a-p* and 450*b*-1 to 450*b-p* are recess portions which are respectively open on the +R2 side surface of the connector CN2 and formed from the opening to the −R1 side along the R2 direction. A conductive member (not illustrated) is provided inside each of the recess portions formed as the insertion holes 450*a*-1 to 450*a-p* and 450*b*-1 to 450*b-p*.

The insertion holes 450*a*-1 to 450*a-p* are arranged side by side at equal intervals to be separated from each other with an inter-pitch distance ps1, from the −P2 side to the +P2 side in the order of the insertion holes 450*a*-1, 450*a*-2, . . . , and 450*a-p*, in the direction along the P2 direction. The insertion holes 450*b*-1 to 450*b-p* are arranged side by side at equal intervals to be separated from each other with the inter-pitch distance ps1, from the −P2 side to the +P2 side in the order of the insertion holes 450*b*-1, 450*b*-2, . . . , and 450*b-p*, in the direction along the P2 direction, on the −Q2 side of the insertion holes 450*a*-1 to 450*a-p*, which are arranged side by side along the P2 direction. Here, the fact that the insertion holes are arranged side by side at equal intervals to be separated from each other with the inter-pitch distance ps1 includes a case of being arranged at equal intervals including variations and the like.

Further, the insertion hole 450*a*-1 and the insertion hole 450*b*-1 are arranged side by side to be separated from each other with an inter-pitch distance ps2 in the direction along the Q2 direction, the insertion hole 450*a-p* and the insertion hole 450*b-p* are arranged side by side to be separated from each other with the inter-pitch distance ps2 in the direction along the Q2 direction, and an insertion hole 450*a-i* and an insertion hole 450*b-i* are arranged side by side to be separated from each other with the inter-pitch distance ps2 in the direction along the Q2 direction.

The substrate coupling terminals 451*a*-1 to 451*a-p* and 451*b*-1 to 451*b-p* are conductive members which are respectively provided on the −R2 side surface of the connector CN2, and extend to protrude to the −R2 side along the R2 direction. The substrate coupling terminals 451*a*-1 to 451*a-p* and 451*b*-1 to 451*b-p* are inserted through the head substrate 35 and coupled to the head substrate 35 by soldering or the like, and accordingly, the connector CN2 is electrically coupled to the head substrate 35.

The substrate coupling terminals 451*a*-1 to 451*a-p* are provided corresponding to each of the insertion holes 450*a*-1 to 450*a-p*, and are electrically coupled to the conductive section (not illustrated) provided inside each of the insertion holes 450*a*-1 to 450*a-p*. Specifically, the substrate coupling terminal 451*a*-1 is electrically coupled to the conductive section (not illustrated) provided inside the insertion hole 450*a*-1, the substrate coupling terminal 451*a-p* is electrically coupled to the conductive section (not illustrated) provided inside the insertion hole 450*a-p*, and the substrate coupling terminal 451*a-i* is electrically coupled to the conductive section (not illustrated) provided inside the insertion hole 450*a-i*.

Further, the substrate coupling terminals 451*b*-1 to 451*b-p* are provided corresponding to each of the insertion holes 450*b*-1 to 450*b-p*, and are electrically coupled to the conductive section (not illustrated) provided inside each of the insertion holes 450*b*-1 to 450*b-p*. Specifically, the substrate coupling terminal 451*b*-1 is electrically coupled to the conductive section (not illustrated) provided inside the insertion hole 450*b*-1, the substrate coupling terminal 451*b-p* is electrically coupled to the conductive section (not illustrated) provided inside the insertion hole 450*b-p*, and a substrate coupling terminal 451*b-i* is electrically coupled to the conductive section (not illustrated) provided inside the insertion hole 450*b-i*.

Further, the substrate coupling terminals 451*a*-1 to 451*a-p* are arranged side by side in the order of the substrate coupling terminals 451*a*-1, 451*a*-2, . . . , and 451*a-p* from the −P2 side to the +P2 side in the direction along the P2 direction, and the substrate coupling terminals 451*b*-1 to 451*b-p* are arranged side by side in the order of the substrate coupling terminals 451*b*-1, 451*b*-2, . . . , and 451*b-p* from the −P2 side to the +P2 side in the direction along the P2 direction. The substrate coupling terminal 451*a*-1 and the substrate coupling terminal 451*b*-1 are arranged side by side in the direction along the Q2 direction, the substrate coupling terminal 451*a-p* and the substrate coupling terminal 451*b-p* are arranged side by side in the direction along the Q2 direction, and the substrate coupling terminal 451*a-i* and the substrate coupling terminal 451*b-i* are arranged side by side in the direction along the Q2 direction.

The holding member 460 also functions as an insulating member that holds the insertion holes 450*a*-1 to 450*a-p* and 450*b*-1 to 450*b-p* and the substrate coupling terminals 451*a*-1 to 451*a-p* and 451*b*-1 to 451*b-p* and insulates the conductive members provided inside each of the insertion holes 450*a*-1 to 450*a-p* and 450*b*-1 to 450*b-p* from each other and the substrate coupling terminals 451*a*-1 to 451*a-p* and 451*b*-1 to 451*b-p* from each other.

It is preferable that the holding member 460 also contain the PBT resin similar to the holding member 420 included in the connector CN1. Accordingly, even when ink adheres to the connector CN2, the concern that the characteristics of the holding member 460 change, is reduced and the concern that the characteristics of the insertion holes 450*a*-1 to 540*a-p* and 450*b*-1 to 450*b-p*, which are held by the holding member 460, and the substrate coupling terminals 451*a*-1 to 451*a-p* and 451*b*-1 to 451*b-p* change, is also reduced. As a result, the stability of various signals propagating through the conductive members formed inside the insertion holes 450*a*-1 to 450*a-p* and 450*b*-1 to 450*b-p* and the substrate coupling terminals 451*a*-1 to 451*a-p* and 451*b*-1 to 451*b-p* is improved. In other words, by using the PBT resin as the holding member 460 of the connector CN2, the reliability of the signals propagating through the conductive members formed inside the insertion holes 450*a*-1 to 450*a-p* and 450*b*-1 to 450*b-p* and the substrate coupling terminals 451*a*-1 to 451*a-p* and 451*b*-1 to 451*b-p* is improved.

The connector CN2 configured as described above is a so-called pin socket having 2p (the same number as that of the insertion pins 410*a*-1 to 410*a-p* and 410*b*-1 to 410*b-p* included in the connector CN1) insertion holes 450*a*-1 to 450*a-p* and 450*b*-1 to 450*b-p* provided corresponding to the insertion pins 410*a*-1 to 410*a-p* and 410*b*-1 to 410*b-p* included in the connector CN1. The connector CN2 is provided on the head substrate 35 such that the P2 direction, the Q2 direction, and the R2 direction illustrated in FIGS. 17 to 19 are respectively directions along each of the X direction, the Y direction, and the Z direction illustrated in FIGS. 11 to 13.

Returning to FIGS. 11 to 13, regarding the connector CN1 provided on the aggregate substrate 33 and the connector CN2 provided on the head substrate 35, the connector CN1 is positioned on the +Z side and the connector CN2 is positioned on the −Z side along the Z direction. Then, the insertion pins 410*a*-1 to 410*a-p* and 410*b*-1 to 410*b-p* of the connector CN1 are inserted into the insertion holes 450*a*-1 to 450*a-p* and 450*b*-1 to 450*b-p* of the connector CN2 such that the connector CN1 and the connector CN2 are electrically coupled to each other. As a result, the aggregate substrate 33 provided with the connector CN1 and the head substrate 35 provided with the connector CN2 are electrically coupled to each other.

Specifically, the insertion pin 410*a*-1 included in the connector CN1 is inserted into the insertion hole 450*a*-1 included in the connector CN2. Accordingly, the insertion pin 410*a*-1 and the conductive member formed inside the insertion hole 450*a*-1 are electrically coupled to each other. Therefore, the substrate coupling terminal 411*a*-1 that is electrically coupled to the insertion pin 410*a*-1 is electrically coupled to the substrate coupling terminal 451*a*-1 that is electrically coupled to the conductive member formed inside the insertion hole 450*a*-1. As a result, the aggregate substrate 33 electrically coupled via the substrate coupling terminal 411*a*-1 and the head substrate 35 electrically coupled via the substrate coupling terminal 451*a*-1 are electrically coupled to each other.

Similarly, the insertion pin 410*a-i* included in the connector CN1 is inserted into the insertion hole 450*a-i* included in the connector CN2. Accordingly, the insertion pin 410*a-i* and the conductive member formed inside the insertion hole 450*a-i* are electrically coupled to each other. Therefore, the substrate coupling terminal 411*a-i* that is electrically coupled to the insertion pin 410*a-i* is electrically coupled to the substrate coupling terminal 451*a-i* that is electrically coupled to the conductive member formed inside the insertion hole 450*a-i*. As a result, the aggregate substrate 33 electrically coupled via the substrate coupling terminal 411*a-i* and the head substrate 35 electrically coupled via the substrate coupling terminal 451*a-i* are electrically coupled to each other.

Further, the insertion pin 410*b-i* included in the connector CN1 is inserted into the insertion hole 450*b-i* included in the connector CN2. Accordingly, the insertion pin 410*b-i* and the conductive member formed inside the insertion hole 450*b-i* are electrically coupled to each other. Therefore, the substrate coupling terminal 411*b-i* that is electrically coupled to the insertion pin 410*b-i* is electrically coupled to the substrate coupling terminal 451*b-i* that is electrically coupled to the conductive member formed inside the insertion hole 450*b-i*. As a result, the aggregate substrate 33 electrically coupled via the substrate coupling terminal 411*b-i* and the head substrate 35 electrically coupled via the substrate coupling terminal 451*b-i* are electrically coupled to each other.

Here, the connectors CN1 and CN2 that electrically couple the head substrate 35 and the aggregate substrate 33 to each other are examples of a first coupling member, and the insertion pin 410*b-i* included in the connector CN1 is an example of a first conductive section.

Next, a propagation path through which various signals propagate in the aggregate substrate 33 and the head substrate 35, which are electrically coupled to each other, as described above will be described. Various signals including the driving signals COMA, COMB, and COMC and the data signal DATA output by the control unit 10 propagate through a cable (not illustrated) coupled to the connector 330 included in the aggregate substrate 33 and are supplied to the aggregate substrate 33.

Among the driving signals COMA, COMB, and COMC and the data signal DATA input to the aggregate substrate 33, the data signal DATA propagates through the aggregate substrate 33 and is input to the restoration circuit 220 provided on the aggregate substrate 33. The restoration circuit 220 generates and outputs the plurality of clock signals SCK, the plurality of print data signals SI, and the plurality of latch signals LAT corresponding to the plurality of discharge modules 23 by restoring the input data signal DATA. The aggregate substrate 33 propagates the clock signal SCK, the print data signal SI, and the latch signal LAT, which are generated by the restoration circuit 220, and the driving signals COMA, COMB, and COMC input via the connector 330, to the head substrate 35.

The aggregate substrate 33 and the head substrate 35 are electrically coupled to each other by connectors CN1 and CN2 and the cable FC. Specifically, the connector CN1 is fitted to the connector CN2 which is electrically coupled to the surface 33*b* of the aggregate substrate 33 and is electrically coupled to the surface 35*a* of the head substrate 35 such that the aggregate substrate 33 and the head substrate 35 are electrically coupled to each other. The cable FC is electrically coupled to the surface 33*a* of the aggregate substrate 33 at one end and is electrically coupled to the surface 35*a* of the head substrate 35 at the other end such that the aggregate substrate 33 and the head substrate 35 are electrically coupled to each other. In other words, the connectors CN1 and CN2 and the cable FC are electrically coupled to each other on different surfaces of the aggregate substrate 33.

A large number of signals are included in the clock signal SCK, the print data signal SI, and the latch signal LAT, which are propagated through the aggregate substrate 33, and the driving signals COMA, COMB, and COMC. Therefore, the voltage values of the clock signal SCK, the print data signal SI, and the latch signal LAT, which are propagated through multiple signal lines, are smaller than those of the driving signals COMA, COMB, and COMC, and thus, the amount of current generated when propagating is also small. The clock signal SCK, the print data signal SI, and the latch signal LAT, which have a small amount of current and are propagated through multiple signal lines, are propagated from the aggregate substrate 33 to the head substrate 35 through the cable FC in which the wiring pattern is formed at high density. In other words, the clock signal SCK, the print data signal SI, and the latch signal LAT, which have a small maximum current value, propagate from the aggregate substrate 33 to the head substrate 35 through the wiring pattern included in the cable FC.

Further, the driving signals COMA and COMB, in which a voltage value is large and thus a large current can be generated, are propagated from the aggregate substrate 33 to the head substrate 35 through the insertion pins 410*a*-1 to 410*a-p* and 410*b*-1 to 410*b-p* in which the cross-sectional area of the propagation path is larger than that of the plurality of wiring patterns included in the cable FC. In other words, the maximum value of the current flowing through the insertion pins 410*a*-1 to 410*a-p* and 410*b*-1 to 410*b-p* is larger than the maximum value of the current flowing through the plurality of wiring patterns included in the cable FC.

Specifically, the driving signal COMA in which a large current can be generated is propagated from the aggregate substrate 33 to the head substrate 35 through any of the insertion pins 410*a*-1 to 410*a-p* and 410*b*-1 to 410*b-p* included in the connector CN1, and the driving signal COMB in which a large current can be generated is propagated from the aggregate substrate 33 to the head substrate 35 through the insertion pins 410*a*-1 to 410*a-p* and 410*b*-1 to 410*b-p* which are different from the insertion pins 410*a*-1 to 410*a-p* and 410*b*-1 to 410*b-p* to which the driving signal COMA propagates among the insertion pins 410*a*-1 to 410*a-p* and 410*b*-1 to 410*b-p* included in the connector CN1.

Here, since the driving signal COMC supplied to the aggregate substrate 33 drives the piezoelectric element 60 such that the ink is not discharged from the discharge section 600, the voltage amplitude is small compared to the driving signals COMA and COMB for driving the piezoelectric element 60 such that the ink is discharged from the discharge section 600. Therefore, the amount of current generated when the driving signal COMC is propagated is smaller than the amount of current generated when the driving signals COMA and COMB are propagated. It is preferable that the driving signal COMC having such a small amount of current be propagated by the wiring pattern included in the cable FC. In other words, among the driving signals COMA, COMB, and COMC output by the driving circuit unit 50, it is preferable that the driving signals COMA and COMB having a large amount of current generated when propagating propagate through the insertion pins 410*a*-1 to 410*a-p* and 410*b*-1 to 410*b-p* having a large cross-sectional area, and do not propagate by the wiring pattern included in the cable FC having a small cross-sectional area, and the driving signal COMC having a small amount of current generated when propagating propagate by the wiring pattern included in the cable FC having a small cross-sectional area, and do not propagate through the insertion pins 410*a*-1 to 410*a-p* and 410*b*-1 to 410*b-p* having a large cross-sectional area.

Since the insertion pins 410*a*-1 to 410*a-p* and 410*b*-1 to 410*b-p* have a large cross-sectional area, when a signal having a small amount of current propagates using the insertion pins 410*a*-1 to 410*a-p* and 410*b*-1 to 410*b-p*, there is a concern that the specifications become excessive. As a result, there is a concern that the miniaturization of the connectors CN1 and CN2 and the miniaturization of the head module 21 is hindered. Therefore, by propagating the driving signal COMC having a small amount of current by the wiring pattern included in the cable FC having a small cross-sectional area, the concern that the connectors CN1 and CN2 become large is reduced, and as a result, the head module 21 can be miniaturized.

Here, whether the driving signal COMC propagates by the wiring pattern included in the cable FC having a small cross-sectional area or propagates through the insertion pins 410*a*-1 to 410*a-p* and 410*b*-1 to 410*b-p* having a large cross-sectional area may be appropriately changed depending on the amount of current generated when the driving signal COMC is propagated. Specifically, when the number of discharge sections 600 included in the discharge module 23 is a predetermined number or more, it is estimated that the amount of current generated when the driving signal COMC is propagated increases. In such a case, when the driving signal COMC is propagated by the wiring pattern included in the cable FC having a small cross-sectional area, it becomes necessary to propagate the driving signal COMC by using many wiring patterns included in the cable FC, and as a result, the cable FC becomes large. Therefore, when the number of discharge sections 600 included in the discharge module 23 is a predetermined number or more, it is preferable that the driving signal COMC be propagated by the insertion pins 410*a*-1 to 410*a-p* and 410*b*-1 to 410*b-p* having a large cross-sectional area.

Meanwhile, when the number of discharge sections 600 included in the discharge module 23 is less than a predetermined number, it is estimated that the amount of current generated when the driving signal COMC is propagated decreases. In such a case, when the driving signal COMC propagates through the insertion pins 410*a*-1 to 410*a-p* and 410*b*-1 to 410*b-p* having a large cross-sectional area, there is a concern that the specifications become excessive. Therefore, when the number of discharge sections 600 included in the discharge module 23 is less than a predetermined number, it is preferable that the driving signal COMC be propagated by the wiring pattern included in the cable FC having a small cross-sectional area.

Then, the clock signal SCK, the print data signal SI, and the latch signal LAT, which are propagated to the head substrate 35 through the connectors CN1 and CN2 and the cable FC, and the driving signals COMA, COMB, and COMC are input to each of the plurality of discharge modules 23 through the wiring member 388 after being branched so as to correspond to the plurality of discharge modules 23, on the head substrate 35. Then, the driving signal selection control circuit 200 mounted on the wiring member 388 by COF generates the driving signal VOUT corresponding to the plurality of discharge sections 600, and the generated driving signal VOUT is supplied to the piezoelectric element 60 included in the corresponding discharge section 600. Accordingly, the piezoelectric element 60 is driven, and the ink having an amount that corresponds to the drive of the piezoelectric element 60 is discharged from the nozzle N.

Here, the aggregate substrate 33 is an example of a second substrate, the surface 33*b* of the aggregate substrate 33 is an example of a first surface, and the surface 33*a* of the aggregate substrate 33 is an example of a second surface.

5. Operational Effect

In recent years, in the liquid discharge apparatus 1, there is an increasing demand for a high image formation speed, which is the speed at which a desired image is formed on the medium P. As one method for achieving a high image formation speed, as illustrated in FIG. 3 or the like of the present embodiment, a method is considered in which the driving circuit unit 50 included in the control unit 10 simultaneously transfers the driving signal COMA having only the trapezoidal waveform Adp for discharging a large amount of ink and the driving signal COMB having only the trapezoidal waveform Bdp for discharging a small amount of ink to the head module 21, and switches whether to supply the driving signal COMA to the piezoelectric element 60 or the driving signal COMB to the piezoelectric element 60 in the cycle T in the discharge module 23 included in the head module 21 to control the dot size formed on the medium P. Accordingly, compared to a method for forming the dots on the medium P by selecting the trapezoidal waveform supplied to the piezoelectric element from the driving signal having the plurality of trapezoidal waveforms in order as described in JP-A-2016-179586, and discharging the ink in plural times based on the selected trapezoidal waveform, it become possible to shorten the time required for propagating the trapezoidal waveform, and as a result, the cycle T regulated by the driving signal can be shortened, and it is possible to achieve a high image formation speed in the liquid discharge apparatus 1.

However, when achieving a high image formation speed by using the method of simultaneously transferring the driving signal COMA having only the trapezoidal waveform Adp for discharging a large amount of ink and the driving signal COMB having only the trapezoidal waveform Bdp for discharging a small amount of ink, to the head module 21, the driving signal COMA preferably drives the piezoelectric element 60 such that a large amount of ink can be discharged with a small trapezoidal waveform Adp, and the driving signal COMB preferably drives the piezoelectric element 60 such that a small amount of ink can be discharged with a small trapezoidal waveform Bdp. Therefore, it becomes necessary to increase the voltage values of the trapezoidal waveforms Adp and Bdp, and as a result, the amount of current generated when the trapezoidal waveforms Adp and Bdp are propagated also increases.

With the increase in the amount of current generated when the trapezoidal waveforms Adp and Bdp are propagated, it is required that the driving signals COMA and COMB having the trapezoidal waveforms Adp and Bdp propagate through the propagation path having a sufficient cross-sectional area in terms of current density. In particular, in the coupling member that couples the substrates to each other in the head module 21, unlike the wiring pattern formed on the substrate, it is difficult to individually form the cross-sectional area corresponding to the amount of current of the propagated signal. Therefore, the driving signals COMA and COMB having a large amount of current may be propagated through a plurality of propagation paths from the viewpoint of ensuring a sufficient cross-sectional area, and as a result, there is a problem that the coupling member that couples the substrates to each other large becomes large in the head module 21.

In response to such a problem, in the liquid discharge apparatus 1 of the present embodiment, the head module 21 includes the cable FC including the wiring pattern for electrically coupling the aggregate substrate 33 and the head substrate 35 to each other, and the connectors CN1 and CN2 that electrically couple the aggregate substrate 33 to the head substrate 35 to each other and have the insertion pins 410*a*-1 to 410*a*-*p* and 410*b*-1 to 410*b*-*p* having a larger cross-sectional area than that of the wiring pattern included in the cable FC. In other words, in the head module 21, the aggregate substrate 33 and the head substrate 35 are electrically coupled to each other by a plurality of coupling methods having different cross-sectional areas of the conductive sections through which signals propagate. Accordingly, the voltage value of the signal propagating between the aggregate substrate 33 and the head substrate 35 or the current value generated when the signal propagates can be selected corresponding to the cross-sectional area of the propagation path through which the signal propagates. Accordingly, when the current value generated when the signal propagates between the aggregate substrate 33 and the head substrate 35 is small, the signal propagates with a plurality of wiring patterns included in the cable FC having a small cross-sectional area, and thus the number of wiring patterns included in the cable FC significantly increases, and the concern that the cable FC becomes large can be reduced. Therefore, the amount of current generated by the driving signal increases due to the increase in the image formation speed, and the concern that the head unit becomes large due to the increase in the amount of current can be reduced.

Further, in the liquid discharge apparatus 1 of the present embodiment, the head module 21 propagates the driving signals COMA and COMB having a large voltage value through the insertion pins 410*a*-1 to 410*a*-*p* and 410*b*-1 to 410*b*-*p* having a large cross-sectional area, and propagates the clock signal SCK, the print data signal SI, and the latch signal LAT, which have a small voltage value, by the wiring pattern included in the cable FC. The liquid discharge apparatus 1 has thousands of discharge sections 600, and therefore, the clock signal SCK, the print data signal SI, and the latch signal LAT contain a large amount of information. By propagating the clock signal SCK, the print data signal SI, and the latch signal LAT containing such a large amount of information by the wiring pattern included in the cable FC capable of forming a high-density wiring pattern, it becomes possible to propagate the clock signal SCK, the print data signal SI, and the latch signal LAT in parallel without increasing the size of the cable FC, and a higher image formation speed becomes possible.

Above, the embodiments have been described, but the present disclosure is not limited to the embodiments, and can be implemented in various modes without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments.

According to an aspect, there is provided a head unit including: a discharge section that includes a piezoelectric element driven by a first driving signal and discharges a liquid in response to drive of the piezoelectric element; a switching circuit that switches whether or not to supply the first driving signal to the piezoelectric element based on a discharge control signal; a first substrate that propagates the first driving signal and the discharge control signal to the switching circuit; a second substrate to which the first driving signal and the discharge control signal are supplied and which propagates the first driving signal and the discharge control signal to the first substrate; a first coupling member including a first conductive section that electrically couples the first substrate and the second substrate to each other; and a second coupling member including a second conductive section that electrically couples the first substrate and the second substrate to each other, in which a cross-sectional area of the first conductive section is larger than a cross-sectional area of the second conductive section.

According to this head unit, the first coupling member including the first conductive section that electrically couples the first substrate and the second substrate to each other, and the second coupling member including the second conductive section that electrically couples the first substrate and the second substrate to each other are provided, and the cross-sectional area of the first conductive section is larger than the cross-sectional area of the second conductive section. In other words, in the head unit, the first substrate and the second substrate are electrically coupled to each other by a plurality of methods for coupling the conductive sections having different cross-sectional areas to each other. Accordingly, corresponding to the voltage value of the signal propagating between the first substrate and the second substrate or the current value generated when the signal propagates, it becomes possible to select the propagation path through which the signal propagates corresponding to the cross-sectional area. Accordingly, when the current value generated when the signal propagates between the first substrate and the second substrate is large, by propagating the signal by using a plurality of second conductive sections having a small cross-sectional area, the concern that the second coupling section including the second conductive section becomes large can be reduced. Accordingly, even when the amount of current generated by the driving signal increases due to the increase in the image formation speed, the concern that the head unit becomes large due to the increase in the amount of current can be reduced.

In the head unit according to the aspect, the first driving signal may be propagated from the second substrate to the first substrate through the first conductive section, and the discharge control signal may be propagated from the second substrate to the first substrate through the second conductive section.

According to this head unit, by propagating the first driving signal having a large voltage value from the second substrate to the first substrate through the first conductive section having a large cross-sectional area, the size of the second conductive section included in the second coupling section does not significantly increase, and accordingly, the concern that the second coupling section including the second conductive section becomes large is reduced. Furthermore, by propagating the discharge control signal having a small voltage value from the second substrate to the first substrate through the second conductive section having a small cross-sectional area, the concern that the first coupling section including the first conductive section becomes large due to excessive specifications caused by propagation of the discharge control signal having a small voltage from the second substrate to the first substrate through the first conductive section having a large cross-sectional area, is reduced. Accordingly, the concern that the head unit becomes large is further reduced.

In the head unit according to the aspect, a maximum value of a current flowing through the first conductive section may be larger than a maximum value of a current flowing through the second conductive section.

According to this head unit, by propagating the signal having a large current value to the first conductive section having a large cross-sectional area, and by propagating the signal having a small current value to the second conductive section having a small cross-sectional area, the size of the second conductive section included in the second coupling section does not significantly increase. Accordingly, the concern that the second coupling section including the second conductive section becomes large is reduced, and thus, the concern that the first coupling section including the first conductive section due to excessive specifications becomes large is also reduced. Accordingly, the concern that the head unit becomes large is further reduced.

In the head unit according to the aspect, a second driving signal for driving the piezoelectric element may be supplied to the second substrate such that the liquid is not discharged from the discharge section.

In the head unit according to the aspect, the first driving signal may propagate through the first conductive section and may not propagate through the second conductive section, and the second driving signal may propagate through the second conductive section and may not propagate through the first conductive section.

In the head unit according to the aspect, the first coupling member may be coupled to a first surface of the second substrate, and the second coupling member may be coupled to a second surface different from the first surface of the second substrate.

According to this head unit, as the second substrate is positioned between the first coupling member and the second coupling member, the concern that the signal that propagates from the second substrate to the first substrate through the first coupling member and the signal that propagates from the second substrate to the first substrate through the second coupling member interfere with each other is reduced. Accordingly, the stability of the operation of the head unit is improved.

According to another aspect, there is provided a liquid discharge apparatus including: a driving circuit unit having a first driving signal output circuit that outputs a first driving signal; a discharge control unit that outputs a discharge control signal; and a head unit that discharges a liquid based on the first driving signal and the discharge control signal, in which the head unit includes a discharge section that includes a piezoelectric element driven by the first driving signal and discharges the liquid in response to drive of the piezoelectric element, a switching circuit that switches whether or not to supply the first driving signal to the piezoelectric element based on the discharge control signal, a first substrate that propagates the first driving signal and the discharge control signal to the switching circuit, a second substrate to which the first driving signal and the discharge control signal are supplied and which propagates the first driving signal and the discharge control signal to the first substrate, a first coupling member including a first conductive section that electrically couples the first substrate and the second substrate to each other, and a second coupling member including a second conductive section that electrically couples the first substrate and the second substrate to each other, and a cross-sectional area of the first conductive section is larger than a cross-sectional area of the second conductive section.

According to this liquid discharge apparatus, the head unit includes the first coupling member including the first conductive section that electrically couples the first substrate and the second substrate to each other, and the second coupling member including the second conductive section that electrically couples the first substrate and the second substrate to each other are provided, and the cross-sectional area of the first conductive section is larger than the cross-sectional area of the second conductive section. In other words, in the head unit, the first substrate and the second substrate are electrically coupled to each other by a plurality of methods for coupling the conductive sections having different cross-sectional areas to each other. Accordingly, corresponding to the voltage value of the signal propagating between the first substrate and the second substrate or the current value generated when the signal propagates, it becomes possible to select the propagation path through which the signal propagates corresponding to the cross-sectional area. Accordingly, when the current value generated when the signal propagates between the first substrate and the second substrate is large, by propagating the signal by using a plurality of second conductive sections having a small cross-sectional area, the concern that the second coupling section including the second conductive section becomes large can be reduced. Accordingly, even when the amount of current generated by the driving signal increases due to the increase in the image formation speed, the concern that the head unit becomes large due to the increase in the amount of current can be reduced.

In the liquid discharge apparatus according to the aspect, the first driving signal may be propagated from the second substrate to the first substrate through the first conductive section, and the discharge control signal may be propagated from the second substrate to the first substrate through the second conductive section.

According to this liquid discharge apparatus, by propagating the first driving signal having a large voltage value from the second substrate to the first substrate through the first conductive section having a large cross-sectional area, the size of the second conductive section included in the second coupling section does not significantly increase, and accordingly, the concern that the second coupling section including the second conductive section becomes large is reduced. Furthermore, by propagating the discharge control signal having a small voltage value from the second substrate to the first substrate through the second conductive section having a small cross-sectional area, the concern that the first coupling section including the first conductive section becomes large due to excessive specifications caused by propagation of the discharge control signal having a small voltage from the second substrate to the first substrate through the first conductive section having a large cross-sectional area, is reduced. Accordingly, the concern that the head unit becomes large is further reduced.

In the liquid discharge apparatus according to the aspect, a maximum value of a current flowing through the first conductive section may be larger than a maximum value of a current flowing through the second conductive section.

According to this liquid discharge apparatus, by propagating the signal having a large current value to the first conductive section having a large cross-sectional area, and by propagating the signal having a small current value to the second conductive section having a small cross-sectional area, the size of the second conductive section included in the second coupling section does not significantly increase. Accordingly, the concern that the second coupling section including the second conductive section becomes large is reduced, and thus, the concern that the first coupling section including the first conductive section due to excessive specifications becomes large is also reduced. Accordingly, the concern that the head unit becomes large is further reduced.

In the liquid discharge apparatus according to the aspect, the driving circuit unit may have a second driving signal output circuit that outputs a second driving signal for driving the piezoelectric element such that the liquid is not discharged from the discharge section, and the second driving signal may be supplied to the second substrate.

In the liquid discharge apparatus according to the aspect, the first driving signal may propagate through the first conductive section and may not propagate through the second conductive section, and the second driving signal may propagate through the second conductive section and may not propagate through the first conductive section.

In the liquid discharge apparatus according to the aspect, the first driving signal output circuit and the second driving signal output circuit may have the same circuit configuration.

According to this liquid discharge apparatus, in the driving circuit unit, by making the first driving signal output circuit and the second driving signal output circuit have the same circuit configuration, the circuit layout in the driving circuit unit becomes easy.

In the liquid discharge apparatus according to the aspect, the first coupling member may be coupled to a first surface of the second substrate, and the second coupling member may be coupled to a second surface different from the first surface of the second substrate.

According to this liquid discharge apparatus, as the second substrate is positioned between the first coupling member and the second coupling member, the concern that the signal that propagates from the second substrate to the first substrate through the first coupling member and the signal that propagates from the second substrate to the first substrate through the second coupling member interfere with each other is reduced. Accordingly, the stability of the operation of the head unit is improved.

In the liquid discharge apparatus according to the aspect, a plurality of the head units may further be provided, and the plurality of the head units may be provided side by side along a direction intersecting a transport direction in which a medium to which a liquid is discharged is transported.

What is claimed is:

1. A head unit comprising:

a discharge section that includes a piezoelectric element driven by a first driving signal and discharges a liquid in response to drive of the piezoelectric element;

a switching circuit that switches whether or not to supply the first driving signal to the piezoelectric element based on a discharge control signal;

a first substrate that propagates the first driving signal and the discharge control signal to the switching circuit;

a second substrate to which the first driving signal and the discharge control signal are supplied and which propagates the first driving signal and the discharge control signal to the first substrate;

a first coupling member including a first conductive section that electrically couples the first substrate and the second substrate to each other, the first conductive section being a conductive pin; and a second coupling member including a second conductive section that electrically couples the first substrate and the second substrate to each other, the second conductive section being a flexible printed circuit, wherein a cross-sectional area of the first conductive section is larger than a cross-sectional area of the second conductive section.

2. The head unit according to claim 1, wherein the first driving signal is propagated from the second substrate to the first substrate through the first conductive section, and the discharge control signal is propagated from the second substrate to the first substrate through the second conductive section.

3. The head unit according to claim 1, wherein a maximum value of a current flowing through the first conductive section is larger than a maximum value of a current flowing through the second conductive section.

4. The head unit according to claim 1, wherein a second driving signal for driving the piezoelectric element is supplied to the second substrate such that the liquid is not discharged from the discharge section.

5. The head unit according to claim 4, wherein the first driving signal propagates through the first conductive section and does not propagate through the second conductive section, and the second driving signal propagates through the second conductive section and does not propagate through the first conductive section.

6. The head unit according to claim 1, wherein the first coupling member is coupled to a first surface of the second substrate, and the second coupling member is coupled to a second surface different from the first surface of the second substrate.

7. A liquid discharge apparatus comprising:

a driving circuit unit having a first driving signal output circuit that outputs a first driving signal;

a discharge control unit that outputs a discharge control signal; and a head unit that discharges a liquid based on the first driving signal and the discharge control signal, wherein the head unit includes a discharge section that includes a piezoelectric element driven by the first driving signal and discharges the liquid in response to drive of the piezoelectric element, a switching circuit that switches whether or not to supply the first driving signal to the piezoelectric element based on the discharge control signal, a first substrate that propagates the first driving signal and the discharge control signal to the switching circuit, a second substrate to which the first driving signal and the discharge control signal are supplied and which propagates the first driving signal and the discharge control signal to the first substrate, a first coupling member including a first conductive section that electrically couples the first substrate and the second substrate to each other, the first conductive section being a conductive pin, and a second coupling member including a second conductive section that electrically couples the first substrate and the second substrate to each other, the second conductive section being a flexible printed circuit, and a cross-sectional area of the first conductive section is larger than a cross-sectional area of the second conductive section.

8. The liquid discharge apparatus according to claim 7, wherein the first driving signal is propagated from the second substrate to the first substrate through the first conductive section, and the discharge control signal is propagated from the second substrate to the first substrate through the second conductive section.

9. The liquid discharge apparatus according to claim 7, wherein a maximum value of a current flowing through the first conductive section is larger than a maximum value of a current flowing through the second conductive section.

10. The liquid discharge apparatus according to claim 7, wherein the driving circuit unit has a second driving signal output circuit that outputs a second driving signal for driving the piezoelectric element such that the liquid is not discharged from the discharge section, and the second driving signal is supplied to the second substrate.

11. The liquid discharge apparatus according to claim 10, wherein the first driving signal propagates through the first conductive section and does not propagate through the second conductive section, and the second driving signal propagates through the second conductive section and does not propagate through the first conductive section.

12. The liquid discharge apparatus according to claim 10, wherein the first driving signal output circuit and the second driving signal output circuit have the same circuit configuration.

13. The liquid discharge apparatus according to claim 7, wherein the first coupling member is coupled to a first surface of the second substrate, and the second coupling member is coupled to a second surface different from the first surface of the second substrate.

14. The liquid discharge apparatus according to claim 7, further comprising:

a plurality of the head units, wherein the plurality of the head units are provided side by side along a direction intersecting a transport direction in which a medium to which a liquid is discharged is transported.

* * * * *